US012451102B2

(12) United States Patent
Uhm et al.

(10) Patent No.: US 12,451,102 B2
(45) Date of Patent: Oct. 21, 2025

(54) DISPLAY CONTROL METHOD AND ELECTRONIC DEVICE SUPPORTING SAME

(71) Applicant: Samsung Electronics Co., Ltd., Suwon-si (KR)

(72) Inventors: Minsuk Uhm, Suwon-si (KR); Sungyoung Shin, Suwon-si (KR); Taewoong Lee, Suwon-si (KR); Jongkon Bae, Suwon-si (KR); Hyunchang Shin, Suwon-si (KR); Byungduk Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 18/149,993

(22) Filed: Jan. 4, 2023

(65) Prior Publication Data

US 2023/0145126 A1 May 11, 2023

Related U.S. Application Data

(63) Continuation of application No. PCT/KR2021/009114, filed on Jul. 15, 2021.

(30) Foreign Application Priority Data

Jul. 15, 2020 (KR) ........................ 10-2020-0087670

(51) Int. Cl.
*G09G 5/10* (2006.01)
*G09G 3/20* (2006.01)

(52) U.S. Cl.
CPC ............. *G09G 5/10* (2013.01); *G09G 3/2003* (2013.01); *G09G 2320/0626* (2013.01); *G09G 2354/00* (2013.01)

(58) Field of Classification Search
CPC ................... G09G 5/10; G09G 3/2003; G09G 2320/0626; G09G 2354/00;
(Continued)

(56) References Cited

U.S. PATENT DOCUMENTS 8,674,904 B2 3/2014 Taguchi et al.
9,001,010 B2 4/2015 Jeon
(Continued)

FOREIGN PATENT DOCUMENTS

CN 109274792 A 1/2019
CN 110047897 A 7/2019
(Continued)

OTHER PUBLICATIONS

International Search Report dated Oct. 28, 2021, issued in International Patent Application No. PCT/2021/009114.
(Continued)

*Primary Examiner* — Xiao M Wu
*Assistant Examiner* — Latrell Anthony Creary
(74) *Attorney, Agent, or Firm* — Jefferson IP Law, LLP

(57) ABSTRACT

An electronic device is provided. The electronic device includes a display, an optical sensor disposed below the display, and at least one processor, wherein the display includes a first region having a first pixel density and a second region having a second pixel density less than the first pixel density and corresponding to the disposed region of the optical sensor, the at least one processor determines a second brightness level for the second region on the basis of at least one among a first brightness level of the first region, the first pixel density, and the second pixel density when the first brightness level exceeds a predetermined threshold, identifies a third region, defined to include the second
(Continued)

region, of the display along an edge of the first region, and sets the brightness of the second and third regions to the second brightness level.

20 Claims, 25 Drawing Sheets

(58) Field of Classification Search
CPC ... G09G 2320/0233; G09G 2340/0407; G09G 3/20; G09G 2320/04; G09G 2320/062; G09G 2320/0686; G09G 2360/16; G09G 5/001; G09G 2300/02; G09G 2320/0666; G09G 2360/145; G06F 1/1641
See application file for complete search history.

(56) References Cited

U.S. PATENT DOCUMENTS

| | | | | |
|---|---|---|---|---|
| 10,026,350 | B2 | 7/2018 | Jun et al. | |
| 10,121,831 | B2 | 11/2018 | Rappoport et al. | |
| 10,163,984 | B1 | 12/2018 | Ho et al. | |
| 10,381,381 | B1 | 8/2019 | Choi et al. | |
| 11,315,469 | B2 | 4/2022 | Li et al. | |
| 2009/0140665 | A1* | 6/2009 | Park | G09G 3/3426 315/291 |
| 2017/0076654 | A1 | 3/2017 | Wang | |
| 2017/0316727 | A1 | 11/2017 | Mizusako et al. | |
| 2017/0358275 | A1* | 12/2017 | Klement | G06F 16/951 |
| 2018/0121067 | A1 | 5/2018 | Lee et al. | |
| 2018/0159971 | A1* | 6/2018 | Yang | G06F 3/04842 |
| 2019/0080643 | A1 | 3/2019 | Yang et al. | |
| 2019/0114458 | A1 | 4/2019 | Cho et al. | |
| 2019/0147800 | A1 | 5/2019 | Bae et al. | |
| 2020/0098835 | A1 | 3/2020 | Bae et al. | |
| 2020/0152134 | A1 | 5/2020 | Lee et al. | |
| 2020/0161399 | A1 | 5/2020 | Park et al. | |
| 2020/0213514 | A1 | 7/2020 | Kim et al. | |
| 2020/0312832 | A1 | 10/2020 | Chi et al. | |
| 2020/0335023 | A1* | 10/2020 | Yen | G09G 5/14 |
| 2021/0065625 | A1 | 3/2021 | Wang et al. | |
| 2021/0097936 | A1* | 4/2021 | Ge | G09G 3/2011 |

FOREIGN PATENT DOCUMENTS

| | | | |
|---|---|---|---|
| CN | 110706634 | B | 7/2022 |
| JP | 2017-198889 | A | 11/2017 |
| KR | 10-2019-0041648 | A | 4/2019 |
| KR | 10-2019-0055355 | A | 5/2019 |
| KR | 10-2020-0034290 | A | 3/2020 |
| KR | 10-2020-0057140 | A | 5/2020 |
| KR | 10-2020-0078687 | A | 7/2020 |
| KR | 10-2020-0079868 | A | 7/2020 |

OTHER PUBLICATIONS

European Search Report dated Nov. 21, 2023, issued in European Application No. 21843546.9.
Korean Office Action dated Jul. 22, 2024, issued in Korean Application No. 10-2020-0087670.
Korean Notice of Patent Grant dated Nov. 25, 2024, issued in Korean Patent Application No. 10-2020-0087670.

* cited by examiner

DISPLAY CONTROL METHOD AND ELECTRONIC DEVICE SUPPORTING SAME

CROSS-REFERENCE TO RELATED APPLICATION(S)

This application is a continuation application, claiming priority under § 365(c), of an International application No. PCT/KR2021/009114, filed on Jul. 15, 2021, which is based on and claims the benefit of a Korean patent application number 10-2020-0087670, filed on Jul. 15, 2020, in the Korean Intellectual Property Office, the disclosure of which is incorporated by reference herein in its entirety.

BACKGROUND

1. Field

The disclosure relates to a display control method and an electronic device supporting the same.

2. Description of Related Art

A display serves as a core interface that provides explicit processes of recognition (e.g., input) and presentation (e.g., output) of information resources. A recent electronic device is equipped with a full screen display that provides an extended screen in order to promote an advanced interaction between the display and a user.

The above information is presented as background information only to assist with an understanding of the disclosure. No determination has been made, and no assertion is made, as to whether any of the above might be applicable as prior art with regard to the disclosure.

SUMMARY

Implementation of a full screen display may require improvement of hardware or software in an electronic device. For example, an optical sensor (e.g., an image sensor, a fingerprint sensor, or an illuminance sensor) disposed on a front surface of the electronic device or exposed through the front surface may be disposed under a display so as not to restrict the screen expansion of the display. In this case, the display area corresponding to a disposition region of the optical sensor may include a non-pixel region where some pixels are removed to support optical functions of the optical sensor.

However, the display area corresponding to the disposition region of the optical sensor may be viewed differently from other display areas because of a reduction in resolution or brightness due to the non-pixel region, which may reduce quality of the display.

Aspects of the disclosure are to address at least the above-mentioned problems and/or disadvantages and to provide at least the advantages described below. Accordingly, an aspect of the disclosure is to provide a display control method capable of improving the difference in visibility of a display including a non-pixel region, and an electronic device supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a display, an optical sensor disposed under the display, and at least one processor electrically connected to the display and the optical sensor.

According to an embodiment, the display includes a first region having a first pixel density and a second region having a second pixel density, which is less than the first pixel density, and corresponding to a disposition region of the optical sensor.

According to an embodiment, the at least one processor identifies a first brightness level for the first region, if the first brightness level exceeds a specified threshold, determine a second brightness level for the second region, based on at least one of the first brightness level, the first pixel density, and the second pixel density, identify a third region of the display defined to include the second region along an edge of the first region, and configure the brightness of the second region and the third region as the second brightness level.

An electronic device according to an embodiment includes a display, an optical sensor disposed under the display, and a display driver integrated circuit electrically connected to the display.

According to an embodiment, the display includes a first region having a first pixel density and a second region having a second pixel density, which is less than the first pixel density, and corresponding to a disposition region of the optical sensor.

According to an embodiment, the display driver integrated circuit identifies a first brightness level for the first region, if the first brightness level exceeds a specified threshold, determine a second brightness level for the second region, based on at least one of the first brightness level, the first pixel density, and the second pixel density, identify a third region of the display defined to include the second region along an edge of the first region, and configure the brightness of the second region and the third region as the second brightness level.

In accordance with another aspect of the disclosure, a display control method of an electronic device is provided. The method includes a display including a first region having a first pixel density and a second region having a second pixel density less than the first pixel density may include identifying a first brightness level for the first region, identifying that the first brightness level exceeds a specified threshold, determining a second brightness level for the second region, based on at least one of the first brightness level, the first pixel density, and the second pixel density, identifying a third region of the display defined to include the second region along an edge of the first region, and configuring the brightness of the second region and the third region as the second brightness level, wherein the electronic device may include an optical sensor disposed under the second region.

According to various embodiments, it is possible to improve a difference in visibility of a display, which is causes by a reduction in resolution or brightness of a non-pixel region, based on partial brightness level control of the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
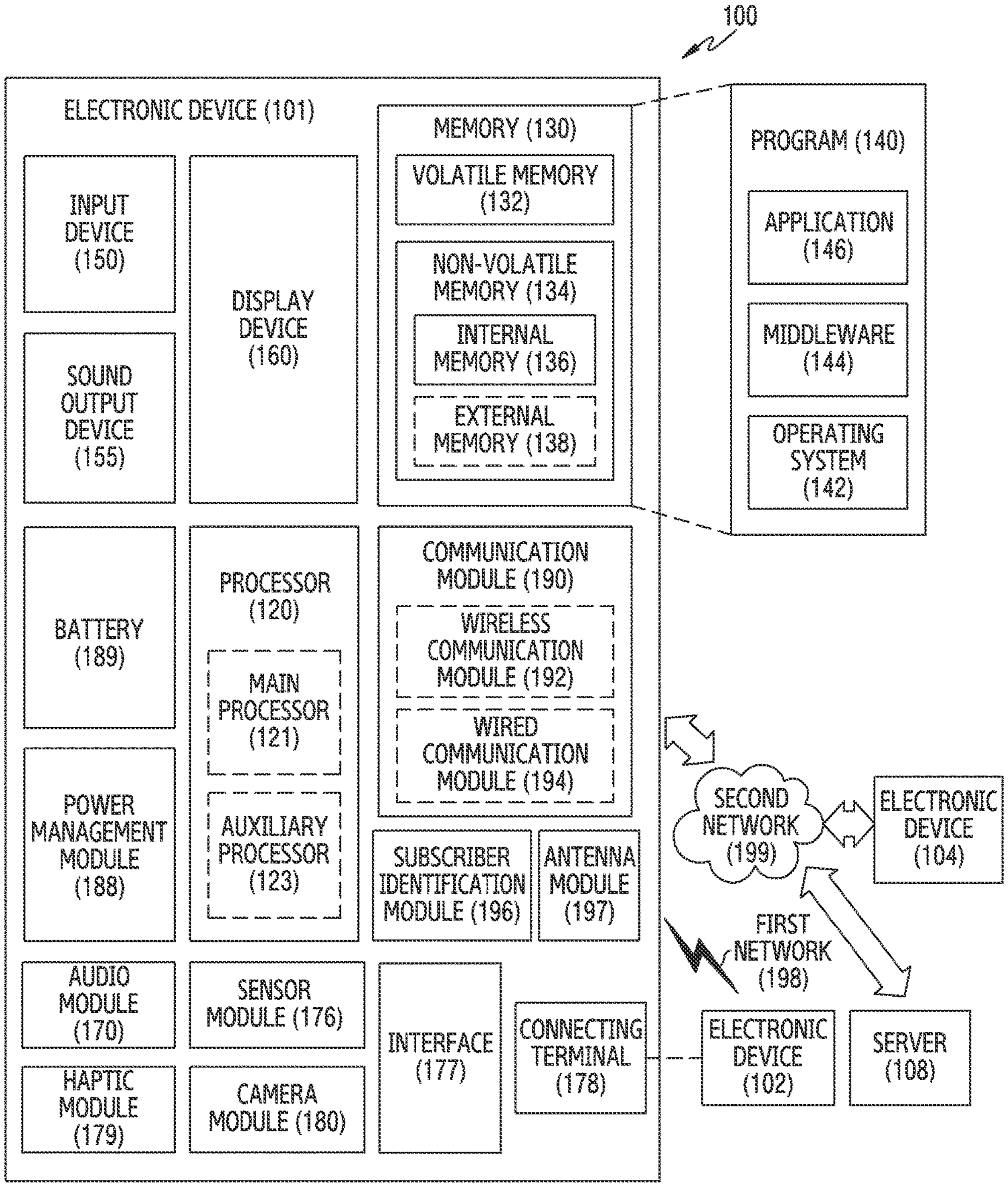
FIG. 1 is a diagram illustrating an electronic device in a network environment according to an embodiment of the disclosure.

FIG. 1 is a diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In other embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may be configured to execute, for example, software (e.g., a program 140) to control at least one other component (e.g., a hardware or software component) of the electronic device 101 coupled with the processor 120, and may perform various data processing or computation. In one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. In another embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, a digital pen (e.g., a stylus pen), and the like.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may be configured to visually provide information to the outside (e.g., a user) of the electronic device 101. The display device 160 may include, for example, a display, a hologram device, or a projector and control circuitry to control a corresponding one of the display, hologram device, and projector. In an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. In another embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. In an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. In an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. In one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may be configured to support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to another embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

In an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. In another embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
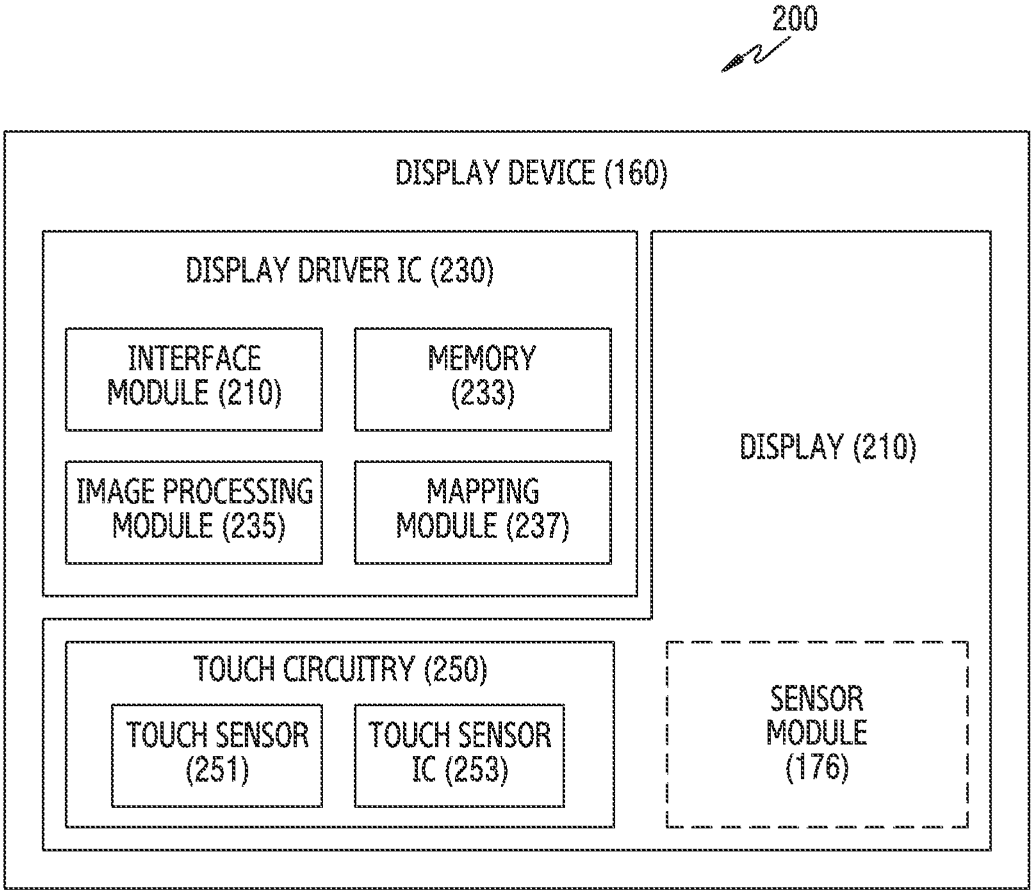
FIG. 2 is a diagram illustrating a display device according to an embodiment of the disclosure.

FIG. 2 is a diagram illustrating a display device according to an embodiment of the disclosure.

Referring to FIGS. 1 and 2, a display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. According to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. In an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. In another embodiment, the generating of the voltage value or current value may be performed, for example, based at least in part on one or more attributes of the pixels (e.g., an array, such as an red, green, and blue (RGB) stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

In yet another embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. In still another embodiment, the touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

The display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. In an embodiment, the touch sensor 251 or the sensor module 176 may be disposed between pixels in a pixel layer of the display 210, or over or under the pixel layer.

Figure 3:
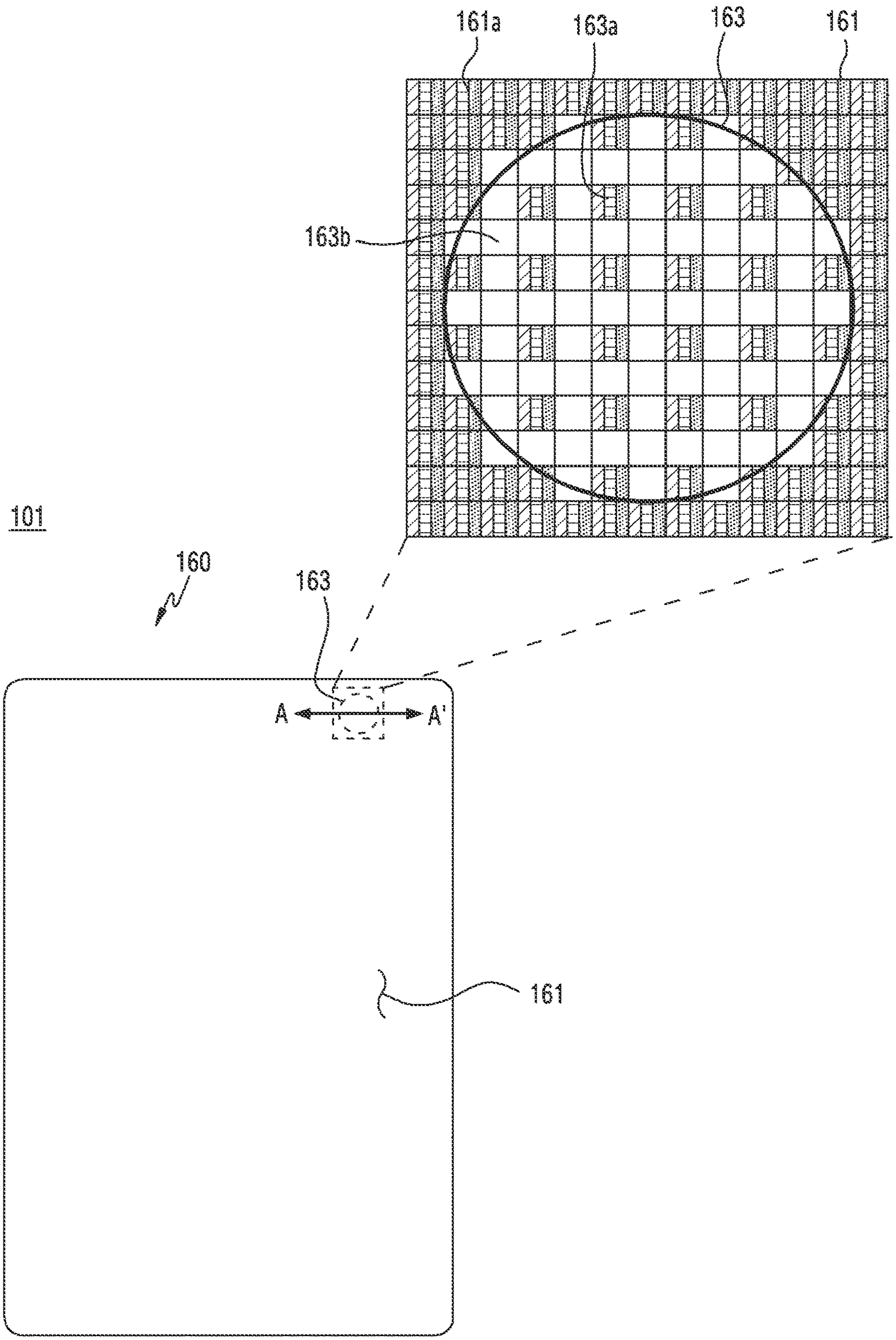
FIG. 3 is a diagram illustrating a first region and a second region of a display device according to an embodiment of the disclosure.

FIG. 3 is a diagram illustrating a first region and a second region of a display device according to an embodiment of the disclosure.

Referring to FIG. 3, a display device 160 (e.g., the display (210 in FIG. 2) of the display device 160, hereinafter referred to as a display 210) of an electronic device 101 according to an embodiment may include a first region 161 and at least one second region 163. In an embodiment, the at least one second region 163 may be formed in various regions of the display 210 according to implementation thereof. The at least one second region 163 may be formed in an upper right region or an upper left region adjacent to an upper edge of the display 210. As an example, the at least one second region 163 may be formed in a region that a user's body (e.g., thumb) may easily access when the user holds the electronic device 101, and for example, the at least one second region 163 may be formed in a lower central region adjacent to a lower edge of the display 210. In an embodiment, the first region 161 may be formed to occupy the remaining area of the display 210, excluding the at least one second region 163.

In another embodiment, at least one optical sensor may be disposed under the display 210 to correspond to the at least one second region 163. The at least one optical sensor may be disposed under the display 210 so as to be vertically aligned with the at least one second region 163. In yet another embodiment, the at least one optical sensor may include at least one of an image sensor supporting capturing images of a peripheral area of the electronic device 101 (e.g., the front of the electronic device 101), an illuminance sensor for detecting the state (e.g., the amount of light) around the electronic device 101, and a biometric sensor for supporting acquisition of biometric information (e.g., fingerprint information or iris information) of a user of the electronic device 101. According to various embodiments, the area or shape of the at least one second region 163 may be variously determined depending on the size, shape, or sensing coverage of the at least one optical sensor.

In still another embodiment, each of the first region 161 and at least one second region 163 may include a plurality of pixels, and each of the plurality of pixels may include a plurality of sub-pixels. For example, one pixel may include an RGB stripe structure configured as a combination of a red sub-pixel, a green sub-pixel, and a blue sub-pixel, which are arranged on the same line, or an red, green, blue and white (RGBW) stripe structure configured as a combination of a red sub-pixel, a green sub-pixel, a blue sub-pixel, and a white sub-pixel, which are arranged on the same line. In another example, one pixel may include an RGBG diamond Pentile structure configured as a combination of a red sub-pixel having a first size, a blue sub-pixel having a second size greater than the first size, and a plurality of green sub-pixels having a third size smaller than the first size. According to various embodiments, the areas, sizes, or shapes of the plurality of sub-pixels included in each of the plurality of pixels may be the same or different from each other. In addition, the separation distances or arrangements between the plurality of sub-pixels included in each of the plurality of pixels may be the same or different from each other.

In yet another embodiment, the at least one second region 163 may include a pixel structure that is different from the first region 161 in order to support an optical function of the optical sensor disposed to correspond to the at least one second region 163, as well as to display content corresponding to image information. The first region 161 may include a plurality of first pixel regions 161*a* where pixels are disposed, and the at least one second region 163 may include a plurality of second pixel regions 163*a* where pixels are disposed and a plurality of non-pixel regions 163*b* where no pixels are disposed. The first region 161 and the at least one second region 163 may support display of content on the entire area of the display 210, based on the plurality of first pixel regions 161*a* and the plurality of second pixel regions 163*a*, and the at least one second region 163 may implement light transmission through the display 210 based on the plurality of non-pixel regions 163*b*, thereby supporting light to enter the optical sensor from the outside or light to exit from the optical sensor to the outside.

In an embodiment, a display layer structure (or stacked structure) may differ between the first region 161 and the at least one second region 163. For example, an opaque layer (e.g., 2060 in FIG. 17C to be described later) may be disposed on the rear surface of a display panel corresponding to the at least one second region 163, and the opaque layer may be excluded from the rear surface of a display panel corresponding to the first region 161. In another embodiment, the first region 161 and the at least one second region 163 may have the same display layer structure (or stacked structure). In another example, the opaque layer may be equally disposed on the rear surfaces of the display panel corresponding to the first region 161 and the at least one second region 163, respectively, or the opaque layer may be excluded therefrom.

According to various embodiments, the plurality of second pixel regions 163*a* and the plurality of non-pixel regions 163*b* included in the at least one second region 163 may be arranged in a regular or irregular sequence. According to other embodiments, electrical wires or circuits (e.g., thin film transistors (TFTs)) related to driving of pixels may be disposed in the same or different arrangements in the plurality of second pixel regions 163*a*. According to still other embodiments, the area of each of the plurality of second pixel regions 163*a* may be the same as or different from the area of each of the plurality of non-pixel regions 163*b*. According to yet other embodiments, the total area of the plurality of second pixel regions 163*a* may be the same as or different from the total area of the plurality of non-pixel regions 163*b*.

According to an embodiment, the pixel density may be different between the first region 161 and the at least one second region 163 due to the plurality of non-pixel regions 163*b*. For example, the first region 161 may include a plurality of first pixel regions 161*a* in which pixels are disposed based on a first pixel density, and the at least one second region 163 may include a plurality of second pixel regions 163*a* in which pixels are disposed based on a second pixel density less than the first pixel density. When the first region 161 has a first pixel density of 100%, the at least one second region 163 may include a non-pixel density of 25%, 50%, or 75%, thereby having a second pixel density of 75%, 50%, or 25%, which is less than the first pixel density. According to another embodiment, based on the first pixel density and the second pixel density different from each other, the number of pixels per unit area included in the at least one second region 163 may be smaller than the number of pixels per unit area included in the first region 161.

Various functional operations of the electronic device 101 described below with reference to the drawings may be performed under direct or indirect control of a processor (e.g., 120 in FIG. 1) or a display driver integrated circuit (e.g., 230 in FIG. 2) that is electrically connected to the display device 160 (or the display 210 of the display device 160) of the electronic device 101. Hereinafter, examples of functional operations of the electronic device 101 under the control of the processor 120 will be described.

Figure 4:
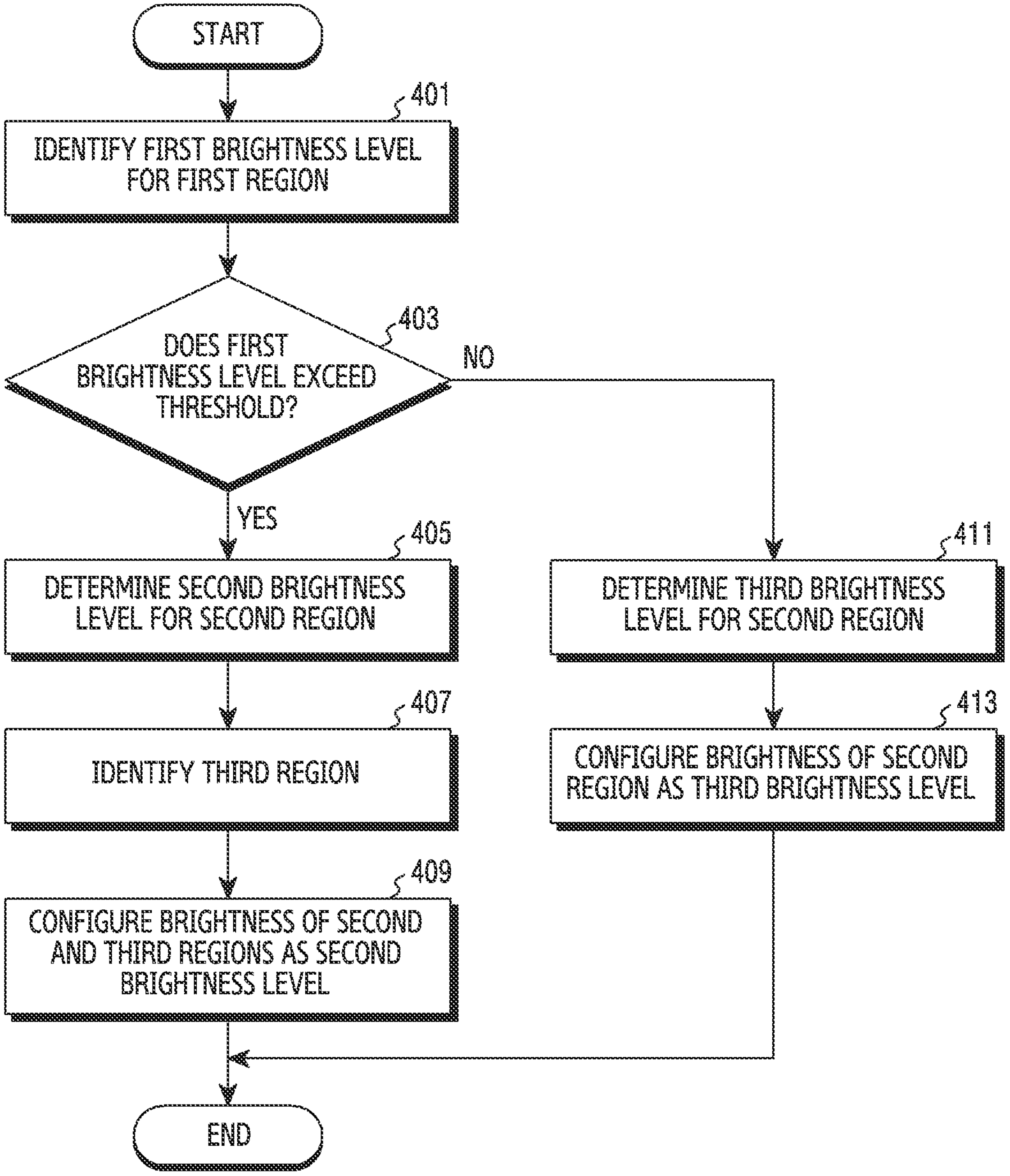
FIG. 4 is a diagram illustrating a method of controlling a display device according to an embodiment of the disclosure.
Figure 5:
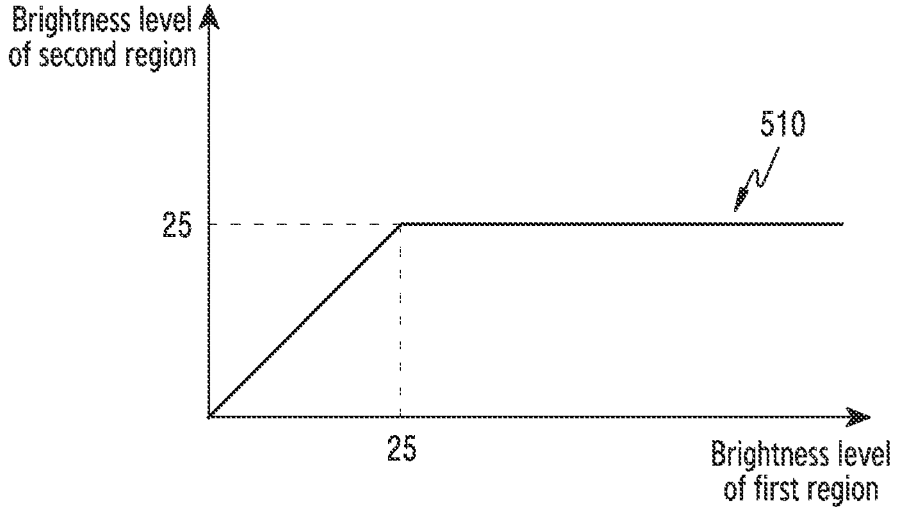
FIG. 5 is a diagram illustrating a brightness level relationship between a first region and a second region of a display device according to an embodiment of the disclosure.
Figure 6:
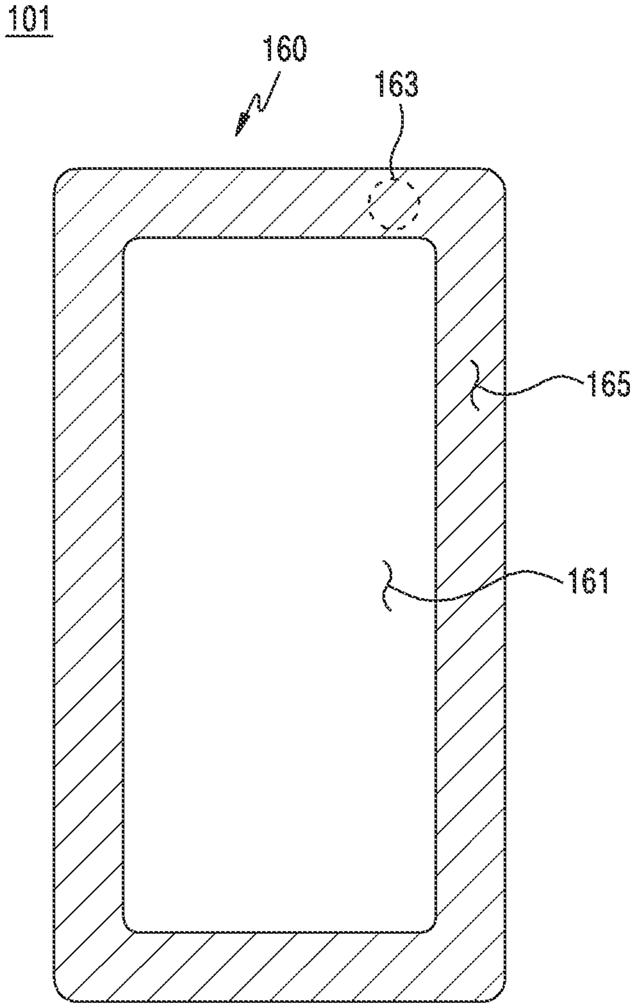
FIG. 6 is a diagram illustrating a third region of a display device according to an embodiment of the disclosure.

FIG. 4 is a diagram illustrating a method of controlling a display device according to an embodiment of the disclosure, FIG. 5 is a diagram illustrating a brightness level relationship between a first region and a second region of a display device according to an embodiment of the disclosure, and FIG. 6 is a diagram illustrating a third region of a display device according to an embodiment of the disclosure.

Referring to FIGS. 4 and 6, in operation 401, a processor (e.g., 120 in FIG. 1) of an electronic device 101 may identify a first brightness level in the first region 161 of a display device 160 (e.g., the display (210 in FIG. 2) of the display device 160, hereinafter referred to as a display 210). The processor 120 may identify a first brightness level in the first region 161 of a display device 160 while displaying an arbitrary screen (e.g., a lock screen, a home screen, or an execution screen of an application) through the display 210. The processor 120 may identify the first brightness level of the first region 161 within a specified time range from displaying the arbitrary screen.

In operation 403, the processor 120 may determine whether or not the identified first brightness level of the first region 161 exceeds a specified threshold. According to an embodiment, the processor 120 may configure a maximum brightness level capable of being covered by at least one second region 163 of the display 210 (or capable of maximally brightening the second region 163) as the specified threshold. In this regard, referring to FIGS. 5 and 6, since at least one second region 163 may have a second pixel density less than a first pixel density of the first region 161 (or may have a plurality of non-pixel regions (163*b* in FIG. 3) from which pixels have been removed), the at least one second region 163 may have a maximum brightness level 510 lower than the maximum brightness level of the first region 161 by a specific ratio. For example, assuming that at least one second region 163 has a second pixel density of 25% compared to a first pixel density of 100% in the first region 161, the at least one second region 163 may have a maximum brightness level 510 corresponding to a ratio of 25% to the maximum brightness level of the first region 161 on the condition that the same driving power is supplied to a plurality of first pixel regions (e.g., 161*a* in FIG. 3) included in the first region 161 and a plurality of second pixel regions (e.g., 163*a* in FIG. 3) included the at least one second region 163. In another example, in the case where at least one second region 163 has a second pixel density of 50% compared to a first pixel density of 100% in the first region 161, the at least one second region 163 may have a maximum brightness level corresponding to a ratio of 50% to the maximum brightness level of the first region 161 on the condition that the same driving power is supplied to a plurality of first pixel regions 161*a* included in the first region 161 and a plurality of second pixel regions 163*a* included the at least one second region 163.

Based on the above description, at least one second region 163 may be controlled to have a brightness level the same as or similar to a brightness level of the first region 161 when the brightness level of the first region 161 is less than or equal to the maximum brightness level of the at least one second region 163. Alternatively, if the brightness level of the first region 161 exceeds the maximum brightness level of the at least one second region 163, the at least one second region 163 may have a brightness level lower than the brightness level of the first region 161 even it is controlled to have a maximum brightness level that may be covered.

In an embodiment, if it is determined that the first brightness level of the first region 161 exceeds a specified threshold in operation 403, the processor 120 may determine a second brightness level of at least one second region 163, which is to be controlled, in operation 405. The processor 120 may determine the second brightness level of at least one second region 163, based on at least one of a first brightness level of the first region 161, a first pixel density of the first region 161, a second pixel density of at least one second region 163, and deterioration that may possibly occur in at least one second region 163. In another embodiment, if the first brightness level of the first region 161 exceeds the specified threshold by a specified level range or more, the processor 120 may determine a maximum brightness level capable of being covered by at least one second region 163 as the second brightness level such that the at least one second region 163 has a brightness level as similar as possible to the first brightness level of the first region 161. Alternatively, if the first brightness level of the first region 161 exceeds the specified threshold by less than the specified level range, the processor 120 may determine a brightness level lowered by a specified level from the maximum brightness level of at least one second region 163 as the second brightness level in order to prevent degradation (e.g., burn-in) that may occur when the at least one second region 163 consistently has the maximum brightness level. According to various embodiments, if the first brightness level of the first region 161 exceeds the specified threshold without determining the specified level range, the processor 120 may determine any one of the maximum brightness level capable of being covered by at least one second region 163 and the brightness level lowered by a specified level from the maximum brightness level as the second brightness level of the at least one second region 163.

In operation 407, the processor 120 may identify a third region 165 of the display 210. According to an embodiment, the processor 120 may determine a third region 165 defined to include a partial region of the first region 161 and at least one second region 163. For example, the processor 120 may determine an edge region of the first region 161 as the third region 165, and in this operation, a region that extends from the edge of the display 210 to have a width covering at least one second region 163, formed adjacent to the edge, may be determined as the edge region of the first region 161. The processor 120 may determine a region defined to have a width capable of including the at least one second region 163 along the edge of the first region 161, based on the edge of the display 210, as the third region 165.

According to various embodiments, the processor 120 may dynamically determine the third region 165, based on the position of at least one second region 163. For example, in the case where the at least one second region 163 is formed in an upper right region or an upper left region adjacent to the upper edge of the display 210, the processor 120 may determine an upper edge region of the first region 161 as the third region 165. In the case where the at least one second region 163 is formed in the lower central region adjacent to the lower edge of the display 210, the processor 120 may determine a lower edge region of the first region 161 as the third region 165. As another example, in the case where the at least one second region 163 is formed in a region adjacent to the upper edge or the lower edge of the display 210, the processor 120 may determine both an upper edge region and a lower edge region of the first region 161 as the third region 165. The width of the third region 165 corresponding to the upper edge region of the first region 161 and the width of the third region 165 corresponding to the lower edge region of the first region 161 may be the same or different from each other. As yet another example, in the case where the at least one second region 163 is formed in a region adjacent to at least one of the upper edge and the lower edge of the display 210, the processor 120 may determine all edge regions of the first region 161, surrounding the central region of the first region 161 (or the central region of the display 210), as the third region 165 without separately dividing the edge regions of the first region 161.

Figure 15A:
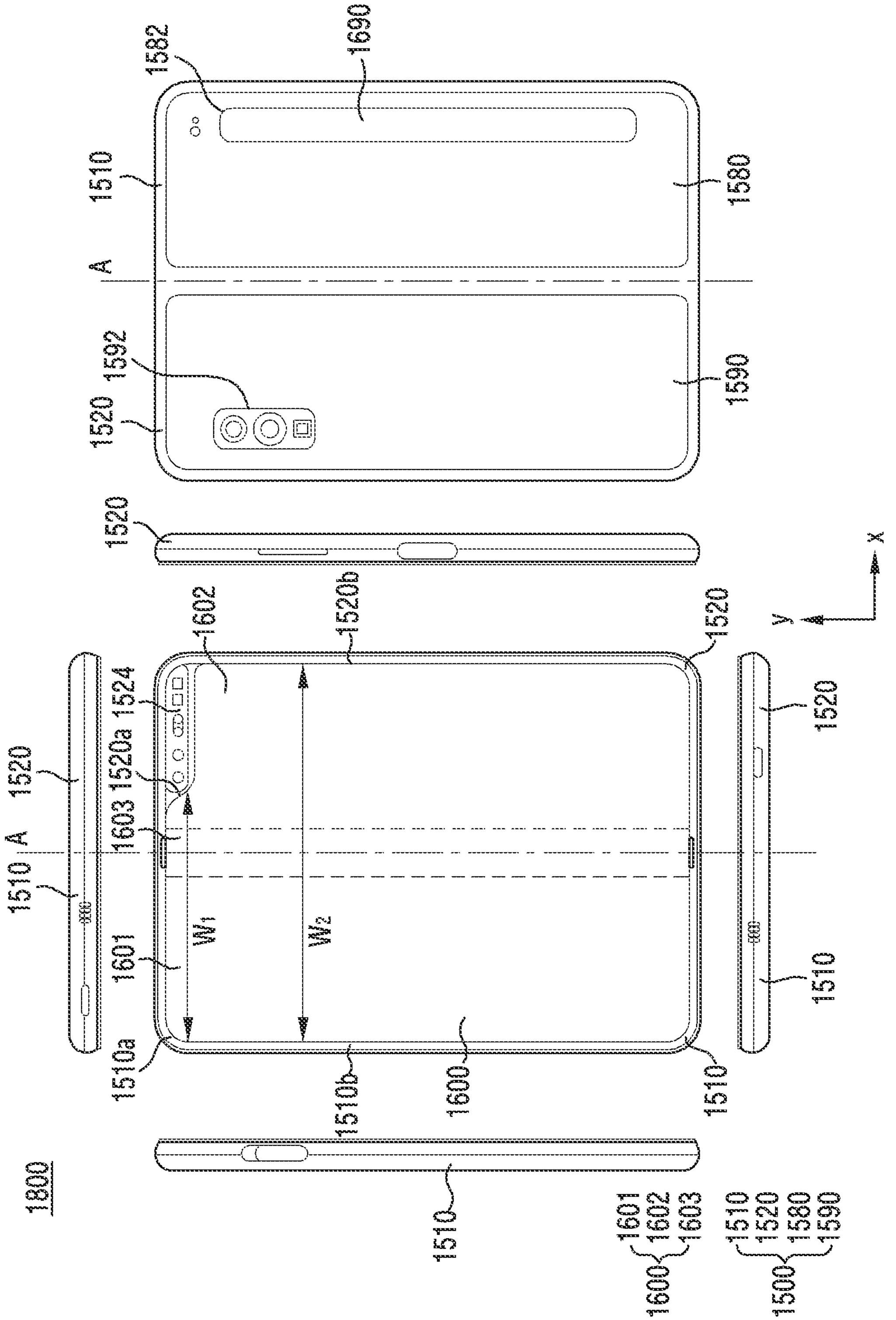
FIG. 15A is a diagram illustrating an unfolded state of an electronic device according to an embodiment of the disclosure.

According to various embodiments, the processor 120 may dynamically determine a third region 165 of a foldable electronic device (e.g., the electronic device 1800 to be described later in FIG. 15A). Although the electronic device 1800 according to the embodiment in FIG. 15A is illustrated as including a sensor area (e.g., 1524 in FIG. 15A) that does not overlap the display (e.g., 1600 in FIG. 15A), according to various embodiments, the sensor area 1524 may be formed in the screen area of the display 1600 (or in the lower area of the display 1600 overlapping the display 1600), similarly to the at least one second region 163 described above. A first region 161 having a large area and having a symmetrical shape with respect to the folded area (e.g., the folding area 1603 in FIG. 15A) may be formed in an unfolded state of the electronic device 1800, and the processor 120 may determine at least one of the upper edge region, the left edge region, the right edge region, and the lower edge region of the first region 161 as the third region 165, based on the position of the sensor area 1524 formed adjacent to at least one of the upper edge and the lower edge of the display 1600.

In operation 409, the processor 120 may configure the second brightness level determined by performing operation 405 as the brightness level of at least one second region 163 and the third region 165. Referring to the above description in this regard, as the first brightness level of the first region 161 exceeds a specified threshold corresponding to the maximum brightness level of at least one second region 163, the at least one second region 163 may have a brightness level lower than the first brightness level of the first region 161 even if it is controlled to have the maximum brightness level (or even if the maximum driving power is supplied). The at least one second region 163 having a lower brightness level than the first region 161 may be viewed differently from the first region 161. The processor 120 may configure the at least one second region 163 and the third region 165 corresponding to the edge region of the first region 161 to have the same second brightness level, thereby improving the issue in which the at least one second region 163 is viewed as a different spot. Additionally or alternatively, the processor 120 may configure the at least one second region 163 and the third region 165 to have the same second brightness level and apply a graphic effect having relationship with the first region 161 to the third region 165 in order to further improve the visibility issue due to a difference between the second brightness level of the at least one second region 163 and the third region 165 and the first brightness level of the first region 161. The graphic effect will be described with reference to FIG. 7 later.

In an embodiment, the processor 120 may control the supply of driving power to at least one second region 163 and the third region 165, thereby configuring the at least one second region 163 and the third region 165 to have the same second brightness level. In this operation, the processor 120 may perform control such that first driving power supplied to the at least one second region 163 is different from second driving power supplied to the third region 165. For example, as the third region 165 has a first pixel density equal to that of the first region 161 and at least one second region 163 has a second pixel density less than the first pixel density, the processor 120 may control a power management module (e.g., 188 in FIG. 1) or a battery (e.g., 189 in FIG. 1) to supply the second driving power, which is less than the first driving power supplied to the at least one second region 163, to the third region 165. For example, it may be assumed that at least one second region 163 has a second pixel density of 25% compared to a first pixel density of 100% of the first region 161. In addition, as the first brightness level of the first region 161 exceeds a specified threshold, it may be assumed that the maximum brightness level capable of being covered by the at least one second region 163 is determined as the second brightness level to be controlled for the at least one second region 163. The processor 120 may perform control such that first driving power of 100% is supplied to the at least one second region 163 in order to configure the at least one second region 163 to have the second brightness level corresponding to the maximum brightness level, and perform control such that second driving power of 25% corresponding to 25% of the first driving power of 100% is supplied to the third region 165.

According to various embodiments, the processor 120 may dynamically determine the second brightness level for at least one second region 163 and the third region 165 in a foldable electronic device (e.g., the electronic device 1800 in FIG. 15A). For example, the processor 120 may obtain information about the degree of folding (e.g., a folding angle) in an unfolded state of the electronic device 1800, and if the information about the degree of folding falls within a first angle range in which at least one second region 163 is not visible to the user's eyes substantially aligned with the electronic device 1800, may not configure the second brightness level for the at least one second region 163 and the third region 165. In another example, if the information about the degree of folding falls within a second angle range, excluding the first angle range from the entire folding angle range supported by the electronic device 1800, the processor 120 may configure the brightness levels of the at least one second region 163 and the third region 165 as the second brightness level.

If it is determined in operation 403 that the first brightness level of the first region 161 does not exceed the specified threshold, the processor 120 may determine a third brightness level to be controlled for the at least one second region

163 in operation 411. In an embodiment, the processor 120 may determine the third brightness level for the at least one second region 163, based on at least one of the first brightness level of the first region 161, the first pixel density of the first region 161, and the second pixel density of the at least one second region 163. For example, as the first brightness level of the first region 161 does not exceed the maximum brightness level (e.g., a specified threshold) capable of being covered by at least one second region 163, the processor 120 may determine the third brightness level to be controlled for the at least one second region 163 to be the same brightness level as the first brightness level of the first region 161. In another example, the processor 120 may determine the third brightness level to be controlled for at least one second region 163 to be a brightness level that is substantially similar to the first brightness level of the first region 161 but lower than the first brightness level. The brightness level lower than the first brightness level may be determined as a level at which the user is unable to recognize a difference between the first brightness level and the brightness level lower than the first brightness level. Alternatively, the processor 120 may visually provide information about candidates of brightness levels lowered from the first brightness level on stages at the time at which it is determined that the first brightness level of the first region 161 does not exceed a specified threshold and determine a brightness level selected by a user input as the third brightness level to be controlled for at least one second region 163.

In operation 413, the processor 120 may configure the brightness level of the at least one second region 163 as the third brightness level determined by performing operation 411. At least one second region 163 and the first region 161 may be configured to have the same or substantially similar brightness levels, thereby improving the issue in which the at least one second region 163 having the second pixel density less than the first pixel density of the first region 161 is viewed as a different spot from the first region 161.

According to various embodiments, the above-described operations 401 to 413 may be performed under the control of a display driver integrated circuit (e.g., 230 in FIG. 2) capable of operating independently of the processor 120. For example, when the processor 120 (or the electronic device 101) is in a low power state, sleep state, or standby state, the display driver integrated circuit 230 may control the display 210 to display an always-on-display (AOD) screen (or AOD content) and, based on the first brightness level of the first region 161 identified by performing operation 401 while displaying the AOD screen, perform operations subsequent to operation 401.

Figure 7:
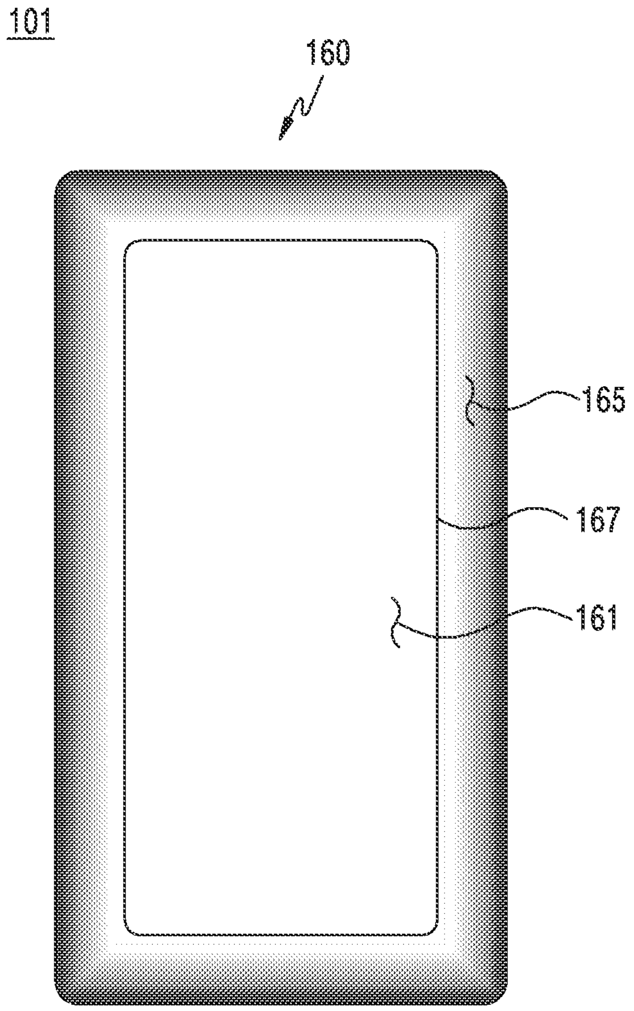
FIG. 7 is a diagram illustrating a graphic effect applied to a third region of a display device according to an embodiment of the disclosure.

FIG. 7 is a diagram illustrating a graphic effect applied to a third region of a display device according to an embodiment of the disclosure.

Referring to FIG. 7, a processor (e.g., 120 in FIG. 1) of an electronic device 101 may configure a third region 165 of a display device 160 (e.g., a display (210 in FIG. 2) of the display device 160, hereinafter referred to as a display 210) to have the second brightness level (see operation 409 in FIG. 4) and then apply a specified graphic effect to the third region 165. In an embodiment, a processor 120 may apply a gradation effect to the third region 165 as at least a part of the specified graphic effect. The processor 120 may apply a gradation effect that gradually changes from a portion of the third region 165 adjacent to the edge of the display 210 to another portion of the third region 165 adjacent to the boundary 167 between the third region 165 and the first region 161. In an embodiment, the processor 120 may control an alpha value of the display 210 for the third region 165, thereby applying a gradation effect in which the transparency of the third region 165 gradually changes between a value of 0.0 and a value of 1.0. In another embodiment, the processor 120 may apply a gradation effect in which a color gradually changes to the third region 165, and in this regard, obtain color information to be reflected in the gradation effect. For example, based on the screen displayed on the display 210 (see operation 401 in FIG. 4), the processor 120 may identify first color that is dominant in a part of the third region 165 adjacent to the edge of the display 210 and a second color dominant in another part of the third region 165 adjacent to the boundary 167, and apply a gradation effect of changing from the first color to the second color to the third region 165. Alternatively, the processor 120 may identify a color-on pixel ratio (C-OPR) (e.g., an average value of grayscales for at least one pixel in an on state (or in a state in which driving power is supplied)) of the first region 161, excluding the third region 165, and apply, to the third region 165, a gradation effect of changing between a third color corresponding to the C-OPR and at least one fourth color in the same group as the third color.

Figure 8A:
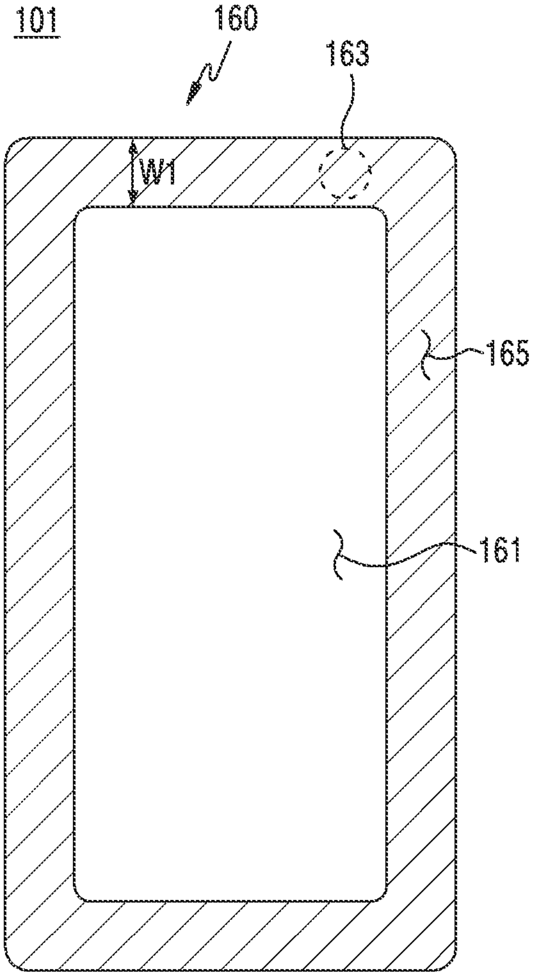
FIGS. 8A and 8B are diagrams illustrating a third region based on context of a display device according to various embodiments of the disclosure.
Figure 8B:
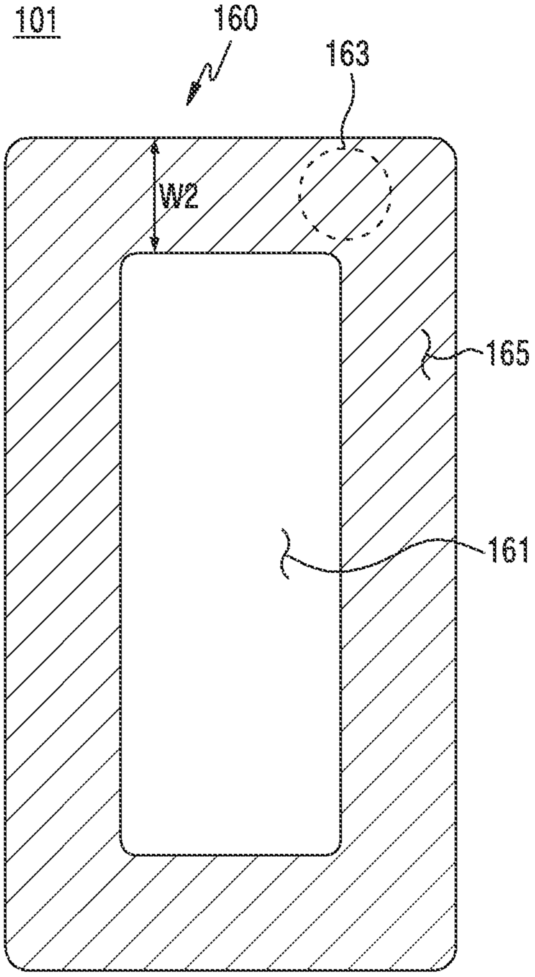

FIGS. 8A and 8B are diagrams illustrating a third region based on context of a display device according to various embodiments of the disclosure.

Referring to FIGS. 8A and 8B, a processor (e.g., 120 in FIG. 1) of an electronic device 101 may determine a width of a third region 165 in an operation (see operation 407 in FIG. 4) of identifying the third region 165 of a display device 160 (e.g., a display (210 in FIG. 2) of the display device 160, hereinafter referred to as a display 210). For example, if the first brightness level of the first region 161 exceeds a specified threshold (e.g., the maximum brightness level capable of being covered by least one second region 163) by less than a specified level range (context a), the processor 120 may determine a region extending from the edge of the display 210 to have a first width w1, which may cover at least one second region 163 formed adjacent to the edge, as a third region 165 corresponding to the edge region of the first region 161. In another example, if the first brightness level of the first region 161 exceeds the specified threshold by the specified level range or more (context b), the processor 120 may determine a region extending from the edge of the display 210 to have a second width w2, which is greater than the first width w1, as a third region 165 corresponding to the edge region of the first region 161. Since a wide gradation effect may be applied to the third region 165 having the second width w2, it is possible to improve the visibility issue due to a relatively big difference between the second brightness level of at least one second region 163 and the third region 165 and the first brightness level of the first region 161.

According to various embodiments, the processor 120 may determine the width of the third region 165 depending on a change in the posture of the electronic device 101. The processor 120 may determine the width of the third region 165 corresponding to the upper edge region of the first region 161 to be different from the width of the third region 165 corresponding to the lower edge region of the first region 161 in a portrait posture of the electronic device 101 and thereafter, if it is determined that the portrait posture switches to a landscape posture, determine the width of the third region 165 corresponding to the left edge region of the first region 161 in the landscape posture (e.g., the upper edge region of the first region 161 in the portrait posture) to be the same as the width of the third region 165 corresponding to the right edge region of the first region 161 (e.g., the lower edge region of the first region 161 in the portrait posture).

Conversely, even when the electronic device 101 switches from the landscape posture to the portrait posture, the width of the third region 165 may be determined in the same or similar manner as the above description. The processor 120 may determine the width of the third region 165 corresponding to the left edge region of the first region 161 to be the same as the width of the third region 165 corresponding to the right edge region of the first region 161 in the landscape posture of the electronic device 101 and thereafter, if the electronic device 101 switches from landscape posture to the portrait posture, determine the width of the third region 165 corresponding to the upper edge region of the first region 161 (e.g., the left edge region of the first region 161 in the landscape posture) to be different from the width of the third region 165 corresponding to the lower edge region of the first region 161 (e.g., the right edge region of the first region 161 in the landscape posture).

Figure 9:
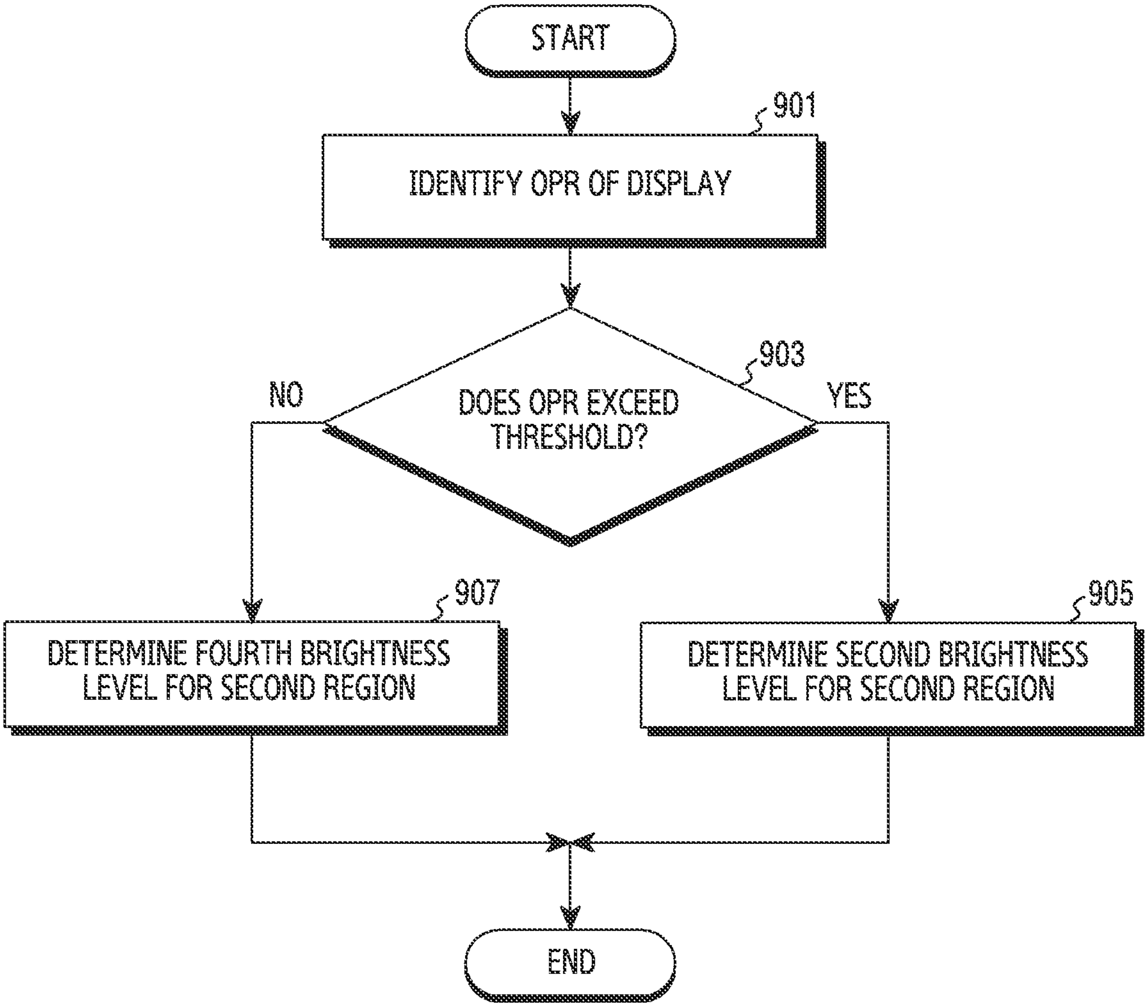
FIG. 9 is a diagram illustrating a method of controlling a display device according to an embodiment of the disclosure.
Figure 10:
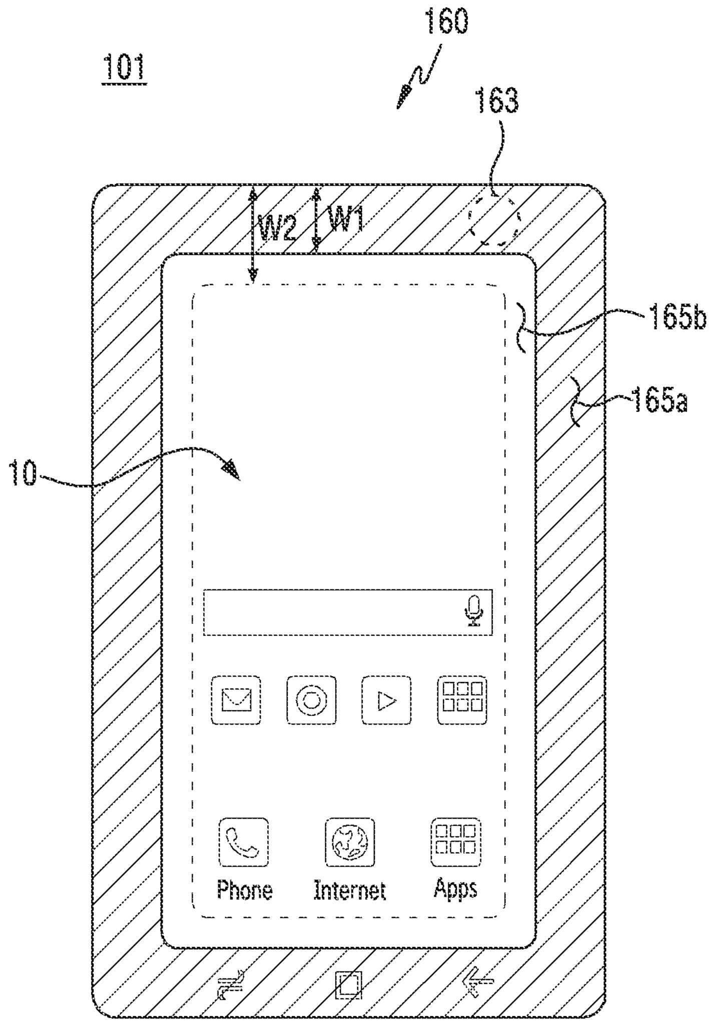
FIG. 10 is a diagram illustrating a third region of a display device according to an embodiment of the disclosure.

FIG. 9 is a diagram illustrating a method of controlling a display device according to an embodiment of the disclosure, and FIG. 10 is a diagram illustrating a third region of a display device according to an embodiment of the disclosure.

Various operations of an electronic device described with reference to FIG. 9 or 10 may be sequentially performed subsequent to operation 401 and operation 403 described above with reference to FIG. 4. If it is determined that the first brightness level identified for the first region of a display device exceeds a specified threshold (e.g., the maximum brightness level capable of being covered by at least one second region), the electronic device may perform the following operations.

Referring to FIGS. 9 and 10, in operation 901, a processor (e.g., 120 in FIG. 1) of an electronic device 101 may identify an on-pixel ratio (OPR) of a display 210 (e.g., a ratio of at least one pixel in an on state (or in a state in which driving power is supplied) to a plurality of pixels included in the display 210) while displaying a screen 10 (see operation 401 in FIG. 4) through a display device 160 (e.g., a display (210 in FIG. 2) of the display device 160, hereinafter referred to as a display 210).

In operation 903, the processor 120 may determine whether or not the identified OPR of the display 210 exceeds a specified OPR threshold. In an embodiment, if the OPR of the display 210 exceeds the OPR threshold, the processor 120 may determine that a bright screen (or bright content) is being displayed through the display 210. Alternatively, if the OPR of the display 210 does not exceed the OPR threshold, the processor 210 may determine that a dark screen (or dark content) is being displayed through the display 210.

If it is determined in operation 903 that the OPR of the display 210 exceeds the OPR threshold, the processor 120 may determine a second brightness level to be controlled for at least one second region 163 in operation 905. If it is determined that a bright screen is being displayed through the display 210, the processor 210 may determine the maximum brightness level capable of being covered by at least one second region 163 as the second brightness level. Alternatively, the processor 210 may determine, as the second brightness level, a brightness level lowered by a specified first level from the maximum brightness level capable of being covered by at least one second region 163.

If it is determined in operation 903 that the OPR of the display 210 does not exceed the OPR threshold, the processor 120 may determine a fourth brightness level to be controlled for at least one second region 163 in operation 907. If it is determined that a dark screen is being displayed through the display 210, the processor 120 may determine, as the fourth brightness level, a brightness level lowered by a second level greater than the first level from the maximum brightness level capable of being covered by at least one second region 163.

In various embodiments, the processor 120 may sequentially perform operations 401 and 403 after performing operations 901 to 907 described above. If it is determined that the first brightness level of the first region 161 exceeds a specified threshold according to operations 401 and 403 performed after performing operations 901 to 907, the processor 120 may apply or process a result of performing operations 901 to 907 (e.g., a brightness level determined for at least one second region 163).

The processor 120 may determine a third region 165*a* or 165*b* of the display 210 after determining the brightness level of the at least one second region 163. For example, the processor 120 may determine, as the third region 165*a* or 165*b*, a region extending from the edge of the display 210 to have a width that may cover at least one second region 163 formed adjacent to the edge. In this operation, in the case where the second brightness level is determined for at least one second region 163, the processor 120 may determine a third region 165*b* having a second width w2 and configure at least one second region 163 and the third region 165*b* having the second width w2 to have the second brightness level. Alternatively, if the fourth brightness level is determined for at least one second region 163, the processor 120 may determine a third region 165*a* having a first width w1 less than the second width w2 and configure the at least one second region 163 and the third region 165*a* having the first width w1 as the fourth brightness level.

Figure 11:
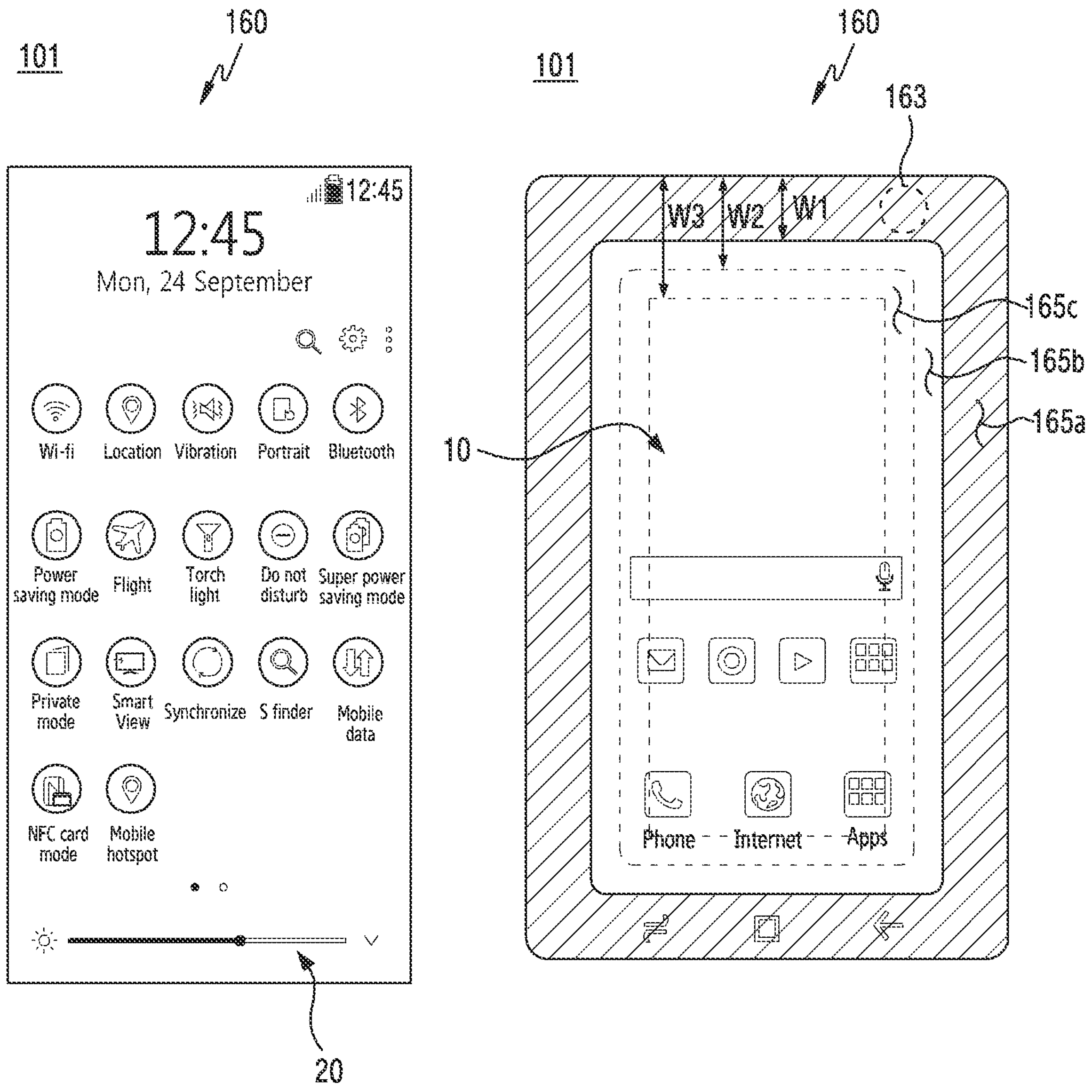
FIG. 11 is a diagram illustrating a third region of a display device according to an embodiment of the disclosure.
Figure 12:
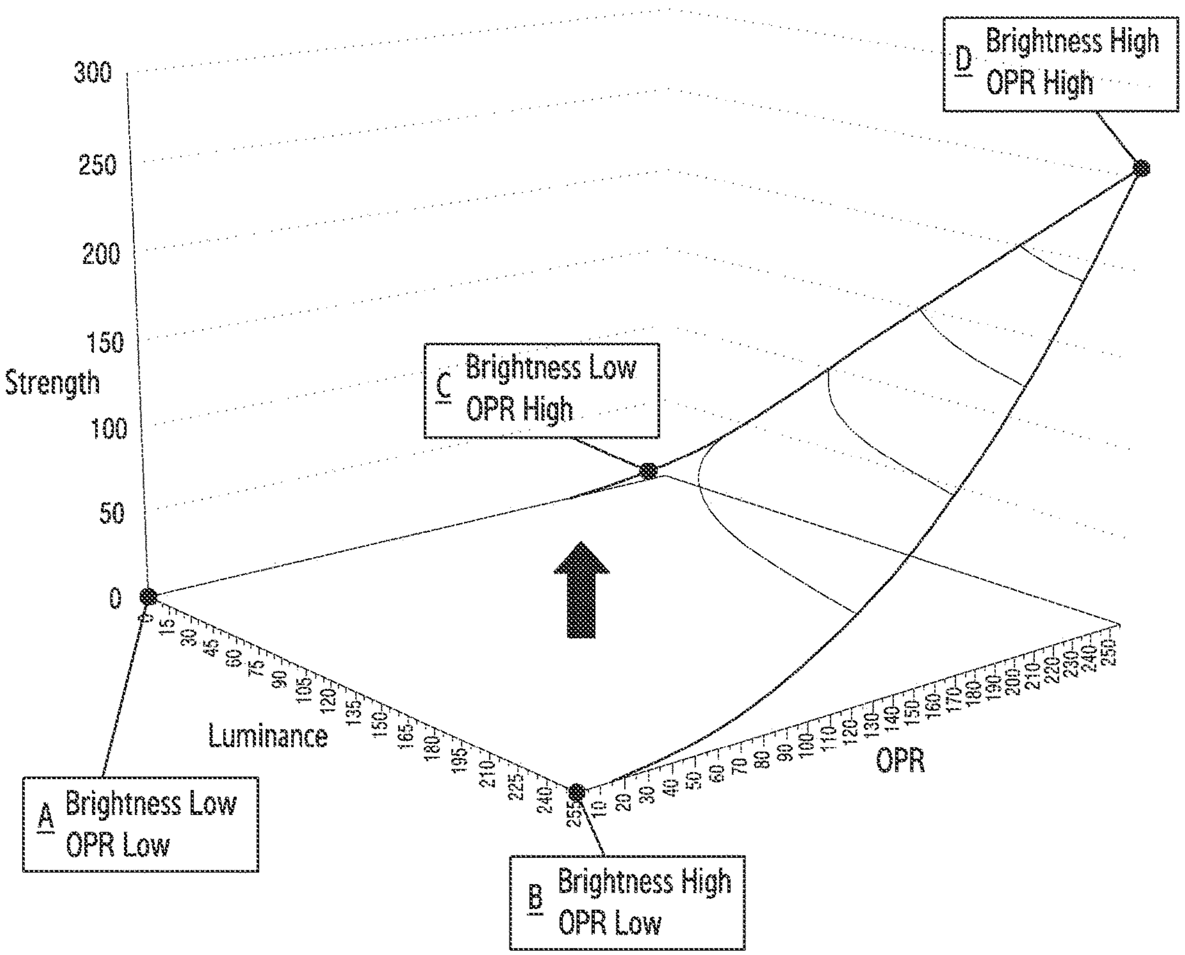
FIG. 12 is a diagram illustrating an example of determining the intensity of a graphic effect applied to a third region of a display device according to an embodiment of the disclosure.

FIG. 11 is a diagram illustrating a third region of a display device according to an embodiment of the disclosure, and FIG. 12 is a diagram illustrating an example of determining the intensity of a graphic effect applied to a third region of a display device according to an embodiment of the disclosure.

Various operations of an electronic device described with reference to FIG. 11 or 12 may be sequentially performed subsequent to operation 401, operation 403, and operation 405 described above with reference to FIG. 4. For example, if it is determined that the first brightness level identified for the first region of a display device exceeds a specified threshold (e.g., the maximum brightness level capable of being covered by at least one second region) and if the second brightness level for at least one second region (e.g., the maximum brightness level capable of being covered by at least one second region or a brightness level lowered by a specified level from the maximum brightness level) is determined, the electronic device may perform the following operations.

Referring to FIGS. 11 and 12, a processor (e.g., 120 in FIG. 1) of an electronic device 101 may identify an on-pixel ratio (OPR) of the display 210 while displaying a screen 10 (see operation 401 in FIG. 4) through a display device 160 (e.g., a display (210 in FIG. 2) of the display device 160, hereinafter referred to as a display 210). In an embodiment, if the identified OPR of the display 210 exceeds a specified first OPR threshold, the processor 120 may determine that a bright screen is being displayed through the display 210, and if the identified OPR of the display 210 does not exceed the specified first OPR threshold, the processor 120 may determine that a dark screen is being displayed through the display 210. In addition, the processor 120 may identify a brightness level 20 (luminance) of the display 210 configured in the electronic device 101 by a user input at the same time as, before, or after identifying the OPR of the display 210.

In an embodiment, the processor 120 may determine the strength of a graphic effect (e.g., a gradation effect) to be applied to the display 210, based on the identified OPR and brightness level 20 of the display 210. The processor 120 may determine, as the strength of graphic effect, the width of a graphic effect (e.g., the width of the third region) to be applied to the display 210.

In another embodiment, if the OPR of the display 210 does not exceed a specified first OPR threshold and if the brightness level 20 configured for the display 210 does not exceed a specified brightness level threshold (context A), the processor 120 may determine a third region 165*a* having a first width w1. Alternatively, if the OPR of the display 210 does not exceed the specified first OPR threshold and if the brightness level 20 of the display 210 exceeds the specified brightness level threshold (context B), the processor 120 may determine a third region 165*a* having the first width w1. The processor 120 may configure a second brightness level for at least one second region 163 and the third region 165*a* having the first width w1, and apply a gradation effect to the third region 165*a* having the first width w1.

In yet another embodiment, if the OPR of the display 210 exceeds the specified first OPR threshold and if the brightness level 20 of the display 210 does not exceed the specified brightness level threshold (context C), the processor 120 may determine a third region 165*b* having a second width w2 greater than the first width w1. The processor 120 may configure a second brightness level for at least one second region 163 and the third region 165*b* having the second width w2, and apply a gradation effect to the third region 165*b* having the second width w2.

In still another embodiment, if the OPR of the display 210 exceeds the specified first OPR threshold and if the brightness level 20 of the display 210 exceeds the specified brightness level threshold (context D), the processor 120 may determine a third region 165*c* having a third width w3 greater than the second width w2. The processor 120 may configure a second brightness level for at least one second region 163 and the third region 165*c* having the third width w3, and apply a gradation effect to the third region 165*c* having the third width w3.

According to various embodiments, the processor 120 may identify distribution of at least one pixel in an on state (or in a state of receiving driving power), based on the OPR, in the operation of identifying the OPR of the display 210. For example, the processor 120 may identify a ratio of at least one pixel in the on state to the identified OPR of the display 210 in the central region of the display 210 defined to have a predetermined area. In an embodiment, if the ratio of at least one pixel in the on state to the identified OPR of the display 210 exceeds a specified ratio in the central region of the display 210, the processor 120 may determine that a bright screen is being displayed in the central region of the display 210 and that a relatively dark screen is being displayed in areas other than the central region. In this case, the processor 120 may determine the width of the third region to be the third width w3 to cover the bright screen displayed in the central region of the display 210, regardless of the identified OPR of the display 210 and the configured brightness level 20 of the display 210.

An electronic device according to the embodiments described above may include a display, an optical sensor disposed under the display, and a processor electrically connected to the display and the optical sensor.

According to other embodiments, the display may include a first region having a first pixel density and a second region having a second pixel density, which is less than the first pixel density, and corresponding to a disposition region of the optical sensor.

According to still other embodiments, the processor may identify a first brightness level for the first region, if the first brightness level exceeds a specified threshold, determine a second brightness level for the second region, based on at least one of the first brightness level, the first pixel density, and the second pixel density, identify a third region of the display defined to include the second region along the edge of the first region, and configure the brightness of the second region and the third region as the second brightness level.

According to various embodiments, the processor may identify the first brightness level for the first region while displaying a screen using the display.

According to other embodiments, the processor may obtain a dominant color from a screen displayed on the first region, excluding the third region, and apply a gradation effect to the third region, based on the obtained color.

According to still other embodiments, the processor may configure a maximum brightness level at which the second region is maximally bright as the specified threshold.

According to various embodiments, the processor may determine the maximum brightness level as the second brightness level if the first brightness level exceeds the specified threshold by a specified level range or more, and determine a brightness level lower than the maximum brightness level as the second brightness level if the first brightness level exceeds the specified threshold by less than the specified level range.

According to other embodiments, the processor may identify an on-pixel ratio (OPR) of the display, if the OPR of the display exceeds a specified OPR threshold, determine the maximum brightness level as the second brightness level, and if the OPR of the display does not exceed the specified OPR threshold, determine a brightness level lower than the maximum brightness level as the second brightness level.

According to still other embodiments, the processor may identify the third region having a first width if the first brightness level exceeds the specified threshold by less than a specified level range, and identify the third region having a second width greater than the first width if the first brightness level exceeds the specified threshold by the specified level range or more.

According to various embodiments, the processor may supply a first driving power to the second region and supply a second driving power less than the first driving power to the third region, as at least part of configuring the second region and the third region as the second brightness level.

According to other embodiments, if the first brightness level does not exceed the specified threshold, the processor may determine a third brightness level for the second region, based on at least one of the first brightness level, the first pixel density, and the second pixel density, and configure the brightness of the second region as the third brightness level.

According to still other embodiments, the processor may determine a brightness level corresponding to the first brightness level as the third brightness level.

According to various embodiments, the first region may include a plurality of first pixel regions based on the first pixel density, and the second region may include a plurality of second pixel regions and a plurality of non-pixel regions based on the second pixel density.

A display control method of an electronic device including a display including a first region having a first pixel density and a second region having a second pixel density less than the first pixel density according to various embodiments described above may include identifying a first brightness level for the first region, identifying that the first brightness level exceeds a specified threshold, determining a second brightness level for the second region, based on at least one of the first brightness level, the first pixel density, and the second pixel density, identifying a third region of the display defined to include the second region along the edge of the first region, and configuring the brightness of the second region and the third region as the second brightness level.

According to various embodiments, the electronic device may include an optical sensor disposed under the second region.

According to other embodiments, the display control method may further include obtaining a dominant color from a screen displayed on the first region, excluding the third region, and applying a gradation effect to the third region, based on the obtained color.

According to still other embodiments, the identifying that the first brightness level exceeds a specified threshold may include configuring a maximum brightness level at which the second region is maximally bright as the specified threshold.

According to various embodiments, the determining of the second brightness level for the second region may include, if the first brightness level exceeds the specified threshold by a specified level range or more, determining the maximum brightness level as the second brightness level, and if the first brightness level exceeds the specified threshold by less than the specified level range, determining a brightness level lower than the maximum brightness level as the second brightness level.

According to other embodiments, the display control method may further include identifying an on-pixel ratio (OPR) of the display.

According to still other embodiments, the determining of the second brightness level for the second region may include, if the OPR of the display exceeds a specified OPR threshold, determining the maximum brightness level as the second brightness level, and if the OPR of the display does not exceed the specified OPR threshold, determining a brightness level lower than the maximum brightness level as the second brightness level.

According to various embodiments, the identifying of the third region of the display may include identifying the third region having a first width if the first brightness level exceeds the specified threshold by less than a specified level range, and identifying the third region having a second width greater than the first width if the first brightness level exceeds the specified threshold by the specified level range or more.

According to other embodiments, the configuring of the brightness of the second region and the third region as the second brightness level may include supplying a first driving power to the second region and supplying a second driving power less than the first driving power to the third region.

An electronic device according to various embodiments described above may include a display, an optical sensor disposed under the display, and a display driver integrated circuit electrically connected to the display.

According to various embodiments, the display may include a first region having a first pixel density and a second region having a second pixel density, which is less than the first pixel density, and corresponding to a disposition region of the optical sensor.

According to other embodiments, the display driver integrated circuit may identify a first brightness level for the first region, if the first brightness level exceeds a specified threshold, determine a second brightness level for the second region, based on at least one of the first brightness level, the first pixel density, and the second pixel density, identify a third region of the display defined to include the second region along the edge of the first region, and configure the brightness of the second region and the third region as the second brightness level.

According to still other embodiments, the display driver integrated circuit may obtain a dominant color from a screen displayed on the first region, excluding the third region, and apply a gradation effect to the third region, based on the obtained color.

Hereinafter, an example of an electronic device structure to which various embodiments of the disclosure may be applied will be described with reference to FIGS. 13A, 13B, and 14.

Figure 13A:
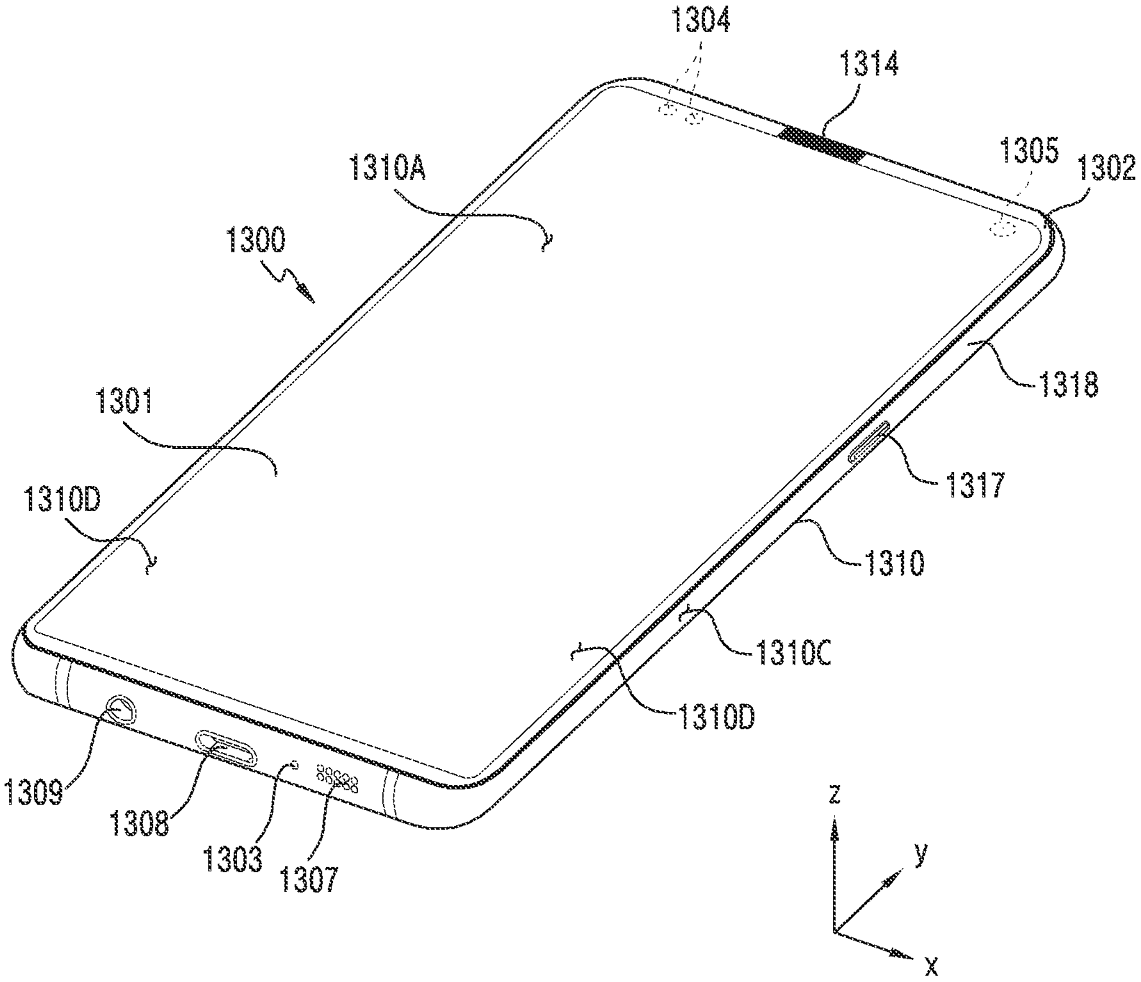
FIG. 13A is a diagram illustrating a front surface of an electronic device according to an embodiment of the disclosure.
Figure 13B:
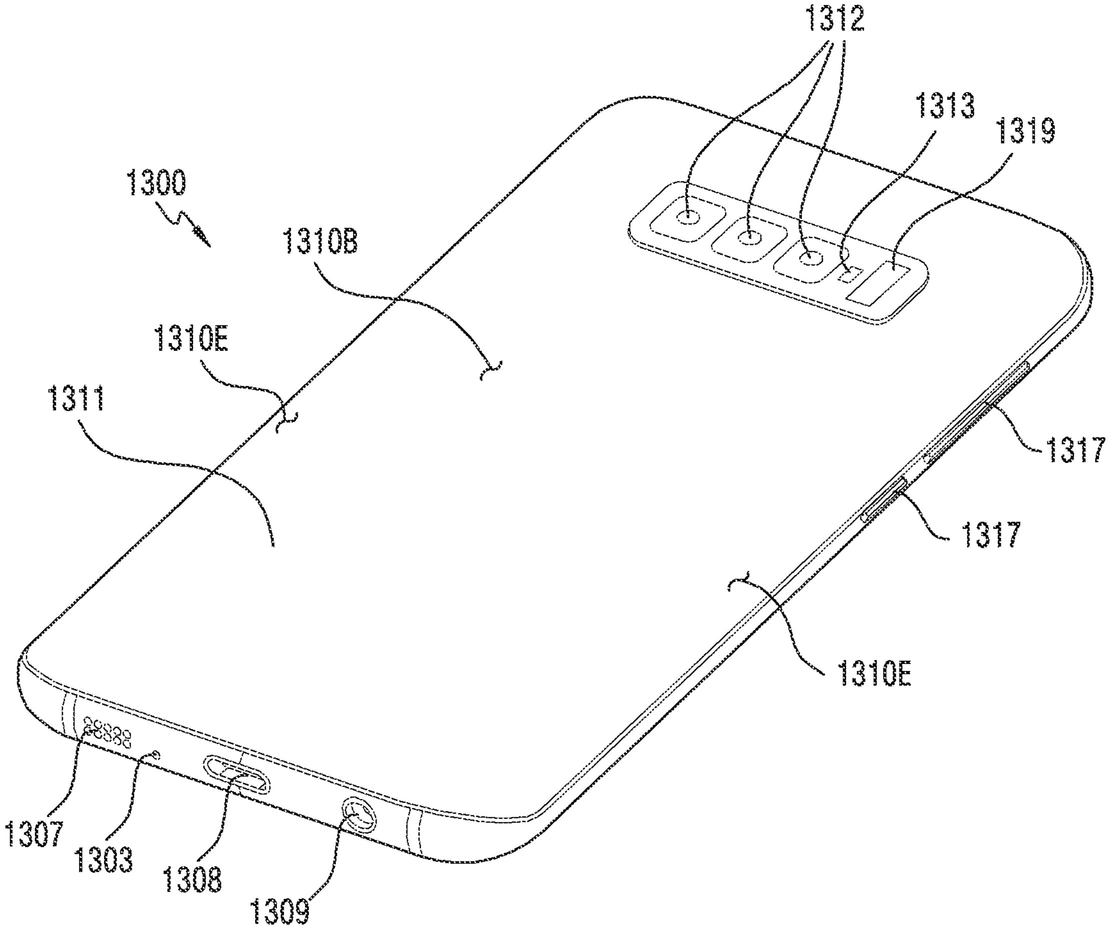
FIG. 13B is a diagram illustrating a rear surface of an electronic device according to an embodiment of the disclosure.

FIG. 13A is a diagram illustrating a front surface of an electronic device according to an embodiment of the disclosure, and FIG. 13B is a diagram illustrating a rear surface of an electronic device according to an embodiment of the disclosure.

Referring to FIGS. 13A and 13B, an electronic device 1300 according to an embodiment may include a housing 1310 that includes a first surface 1310A (or a front surface), a second surface 1310B (or a rear surface), and a side surface 1310C surrounding a space between the first surface 1310A and the second surface 1310B. In another embodiment, the housing 1310 may refer to a structure that forms part of the first surface 1310A, the second surface 1310B, and the side surface 1310C. According to an embodiment, the first surface 1310A may be formed of a front plate 1302 (e.g., a glass plate including various coating layers, or a polymer plate) at least a portion of which is substantially transparent. In an embodiment, the second surface 1310B may be formed of a substantially opaque rear plate 1311. In another embodiment, the rear plate 1311 may be formed of, for example, coated or tinted glass, ceramic, polymer, metal (e.g., aluminum, stainless steel (STS), or magnesium), or a combination of at least two of the above materials. The side surface 1310C may be coupled to the front plate 1302 and the rear plate 1311 and may be formed by a side bezel structure 1318 (or a side member) including metal and/or polymer. In some embodiments, the rear plate 1311 and the side bezel structure 1318 may be integrally formed and may include the same material (e.g., a metal material such as aluminum).

In an embodiment, the front plate 1302 may include two first regions 1310D that extend seamlessly from the first surface 1310A to be bent toward the rear plate 1311 at both ends of the long edge of the front plate 1302. In another embodiment (see FIG. 13B), the rear plate 1311 may include two second regions 1310E that extend seamlessly from the second surface 1310B to be bent toward the front plate 1302 at both ends of the long edge. In still other embodiments, the front plate 1302 (or the rear plate 1311) may include only one of the first regions 1310D (or the second regions 1310E). In some embodiments, some of the first regions 1310D or second regions 1310E may be excluded. In the above embodiment, the side bezel structure 1318, when viewed from the side of the electronic device 1300, may have a first thickness (or width) on the side surface that does not include the first regions 1310D or the second regions

1310E and may have a second thickness, which is less than the first thickness, on the side surface including the first regions 1310D or the second regions 1310E.

According to an embodiment, the electronic device 1300 may include at least one or more of a display 1301, an input device 1303, sound output devices 1307 and 1314, sensor modules 1304 and 1319, camera modules 1305, 1312, and 1313), a key input device 1317, an indicator (not shown), and connectors 1308 and 1309. In some embodiments, the electronic device 1300 may exclude at least one (e.g., the key input device 1317 or the indicator) of the elements or further include other elements.

In an embodiment, the display 1301 may be visible through, for example, a top portion of the front plate 1302. In other embodiments, at least a portion of the display 1301 may be visible through the front plate 1302 forming the first surface 1310A and the first region 1310D of the side surface 1310C. The display 1301 may be connected to a touch sensing circuit, a pressure sensor capable of measuring the intensity (pressure) of a touch, and/or a digitizer detecting a magnetic-field type stylus pen or may be disposed adjacent thereto. In still other embodiments, at least some of the sensor modules 1304 and 1319 and/or at least a part of the key input device 1317 may be disposed in the first region 1310D and/or the second region 1310E.

In some embodiments (not shown), an audio module 1314, at least one or more of the sensor module 1304, the camera module 1305 (e.g., an optical sensor or an image sensor), and a fingerprint sensor may be included in the rear surface of the screen display region of the display 1301. In other embodiments, at least some of the sensor modules 1304 and 1319 and/or at least a part of the key input device 1317 may be disposed in the first regions 1310D and/or the second regions 1310E.

The input device 1303 may include a microphone. In some embodiments, the input device 1303 may include a plurality of microphones disposed to detect the direction of sound. The sound output devices 1307 and 1314 may include speakers. The speakers 1307 and 1314 may include an external speaker 1307 and a call receiver (e.g., an audio module 1314). In other embodiments, the input device 1303 (e.g., a microphone), the speakers 1307 and 1314, and the connectors 1308 and 1309 may be disposed in the space of the electronic device 1300, and may be exposed to the external environment through at least one hole formed in the housing 1310. In some embodiments, a hole formed in the housing 1310 may be commonly used for the input device 1303 (e.g., a microphone) and the speakers 1307 and 1314. In some embodiments, the speakers 1307 and 1314 may include a speaker (e.g., a piezo speaker) that operates without a hole formed in the housing 1310.

In an embodiment, the sensor modules 1304 and 1319 may produce an electrical signal or data value corresponding to an internal operating state of the electronic device 1300 or an external environmental state. In another embodiment, the sensor modules 1304 and 1319 may include, for example, a first sensor module 1304 (e.g., a proximity sensor) disposed on the first surface 1310A of the housing 1310, a second sensor module (not shown) (e.g., a fingerprint sensor), and/or a third sensor module 1319 (e.g., an HRM sensor) disposed on the second surface 1310B of the housing 1310. The fingerprint sensor may be disposed on the second surface 1310B of the housing 1310, as well as on the first surface 1310A (e.g., the display 1301) thereof. The electronic device 1300 may further include at least one of sensor modules that are not shown in the drawing, for example, a gesture sensor, a gyro sensor, an atmosphere pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 1305, 1312, and 1313 may include a first camera module 1305 disposed on the first surface 1310A of the electronic device 1300, a second camera module 1312 disposed on the second surface 1310B, and/or a flash 1313. The camera modules 1305 and 1312 may include one or more lenses, an image sensor, and/or an image signal processor. The flash 1313 may include, for example, a light-emitting diode or a xenon lamp. The first camera module 1305 may be disposed, as an under-display camera (UDC), under the display panel. In some embodiments, two or more lenses (wide-angle and telephoto lenses) and image sensors may be disposed on one surface of the electronic device 1300. In other embodiments, the plurality of first camera modules 1305 may be disposed on the first surface (e.g., the surface on which a screen is displayed) of the electronic device 1300 in the form of an under-display camera (UDC).

In an embodiment, the key input device 1317 may be disposed on the side surface 1310C of the housing 1310. In another embodiment, the electronic device 1300 may exclude a part or entirety of the above-mentioned key input device 1317, and the excluded key input device 1317 may be implemented on the display 1301 in another form such as soft keys or the like. In some embodiments, the key input device 1317 may be implemented using a pressure sensor included in the display 1301.

In an embodiment, the indicator may be disposed, for example, on the first surface 1310A of the housing 1310. The indicator may provide, for example, state information of the electronic device 1300 in the form of light. In another embodiment, the indicator may provide, for example, a light source that interworks with the operation of the camera module 1305. The indicator may include, for example, an LED, an IR LED, and a xenon lamp.

In an embodiment, the connectors 1308 and 1309 may include a first connector hole 1308 capable of receiving a connector (e.g., a USB connector) for transmitting and receiving power and/or data to and from an external electronic device, and/or a second connector hole 1309 (or an earphone jack) capable of receiving a connector for transmitting and receiving audio signals to and from an external electronic device.

Some camera modules 1305 of the camera modules 1305 and 1312, some sensor modules 1304 of the sensor modules 1304 and 1319, or the indicator may be disposed to be visible through the display 1301. The camera module 1305 may be disposed to overlap the display area and may also display a screen in the display area corresponding to the camera module 1305. Some sensor modules 1304 may be disposed in the inner space of the electronic device to perform their functions without being visually exposed through the front plate 1302.

Figure 14:
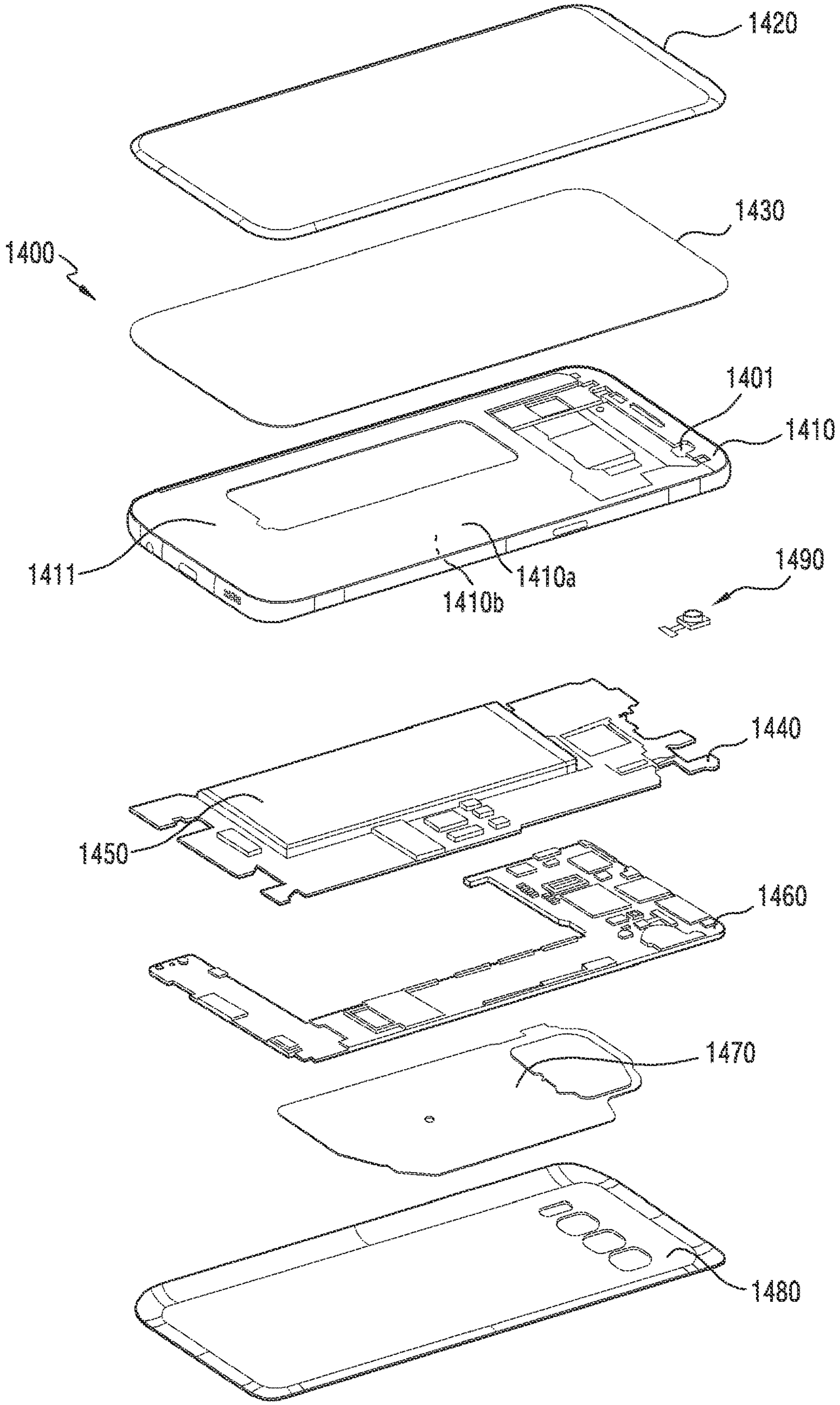
FIG. 14 is an exploded view illustrating an electronic device according to an embodiment of the disclosure.

FIG. 14 is an exploded view illustrating an electronic device according to an embodiment of the disclosure.

Referring to FIG. 14, an electronic device 1400 may include a side member 1410 (e.g., a side bezel structure), a first support member 1411 (e.g., a bracket or support structure), a front plate 1420 (e.g., a front cover), a display 1430, a printed circuit board 1440, battery 1450, a second support member 1460 (e.g., a rear case), an antenna 1470, and a rear plate 1480 (e.g., a rear cover). In some embodiments, the electronic device 1400 may exclude at least one (e.g., the first support member 1411 or the second support member 1460) of the elements or further include other elements. At least one of the elements of the electronic device 1400 may be the same as or similar to at least one of the elements of the electronic device 1300 in FIG. 13A or 13B, so redundant descriptions thereof will be omitted below.

In an embodiment, the first support member 1411 may be disposed inside the electronic device 1400 to be connected to the side member 1410 or to be integrally formed with the side member 1410. In an embodiment, the first support member 1411 may be formed of, for example, a metal material and/or a non-metal (e.g., polymer) material. The first support member 1411 may have a display 1430 coupled to one surface thereof and a printed circuit board 1440 coupled to the opposite side thereof. The printed circuit board 1440 may be equipped with a processor, a memory, and/or an interface mounted thereon. The processor may include, for example, one or more of a central processing unit, an application processor, a graphic processing unit, an image signal processor, a sensor hub processor, or a communication processor. The memory may include, for example, a volatile memory and/or a non-volatile memory.

The interface may include, for example, a high-definition multimedia interface (HDMI), a universal serial bus (USB) interface, an SD card interface, and/or an audio interface. For example, the interface may electrically or physically connect the electronic device 1400 to an external electronic device and include a USB connector, an SD card/MMC connector, or an audio connector.

In an embodiment, the battery 1450 is a device for supplying power to at least one element of the electronic device 1400, and may include, for example, a non-rechargeable primary battery, a rechargeable secondary battery, or a fuel cell. At least a part of the battery 1450 may be disposed, for example, substantially on the same plane as the printed circuit board 1440. The battery 1450 may be integrally disposed inside the electronic device 1400. In another embodiment, the battery 1450 may be disposed to be detachable from the electronic device 1400.

In an embodiment, the antenna 1470 may be disposed between the rear plate 1480 and the battery 1450. In another embodiment, the antenna 1470 may include, for example, a near-field communication (NFC) antenna, a wireless charging antenna, and/or a magnetic secure transmission (MST) antenna. For example, the antenna 1470 may perform short-range communication with an external device or wirelessly transmit and receive power required for charging. In another embodiment, an antenna structure may be formed by a part of the side bezel member 1410 and/or first support member 1411 or a combination thereof.

According to various embodiments, the first support member 1411 of the side member 1410 may include a first surface 1410*a* facing the front plate 1420 and a second surface 1410*b* facing in the opposite direction (e.g., a rear plate direction) of the first surface 1410*a*. According to other embodiments, the camera module 1490 may be disposed between the first support member 1411 and the rear plate 1480. According to still other embodiments, the camera module 1490 may be disposed to protrude toward the front plate 1420 or to be visible through a through-hole 1401 formed from the first surface 1410*a* to the second surface 1410*b* of the first support member 1411. According to various embodiments, a portion of the camera module 1490 protruding through the through hole 1401 may be disposed to detect an external environment at a corresponding position of the display 1430. In another embodiment, in the case where the camera module 1490 is disposed between the display 1430 and the first support member 1411, the through hole 1401 may be unnecessary.

Hereinafter, another example of a structure of an electronic device to which various embodiments of the disclosure may be applied will be described with reference to FIGS. 15A, 15B, and 16.

FIG. 15A is a diagram illustrating an unfolded state of an electronic device according to an embodiment of the disclosure. FIG. 15B is a diagram illustrating a folded state of an electronic device according to an embodiment of the disclosure.

Figure 15B:
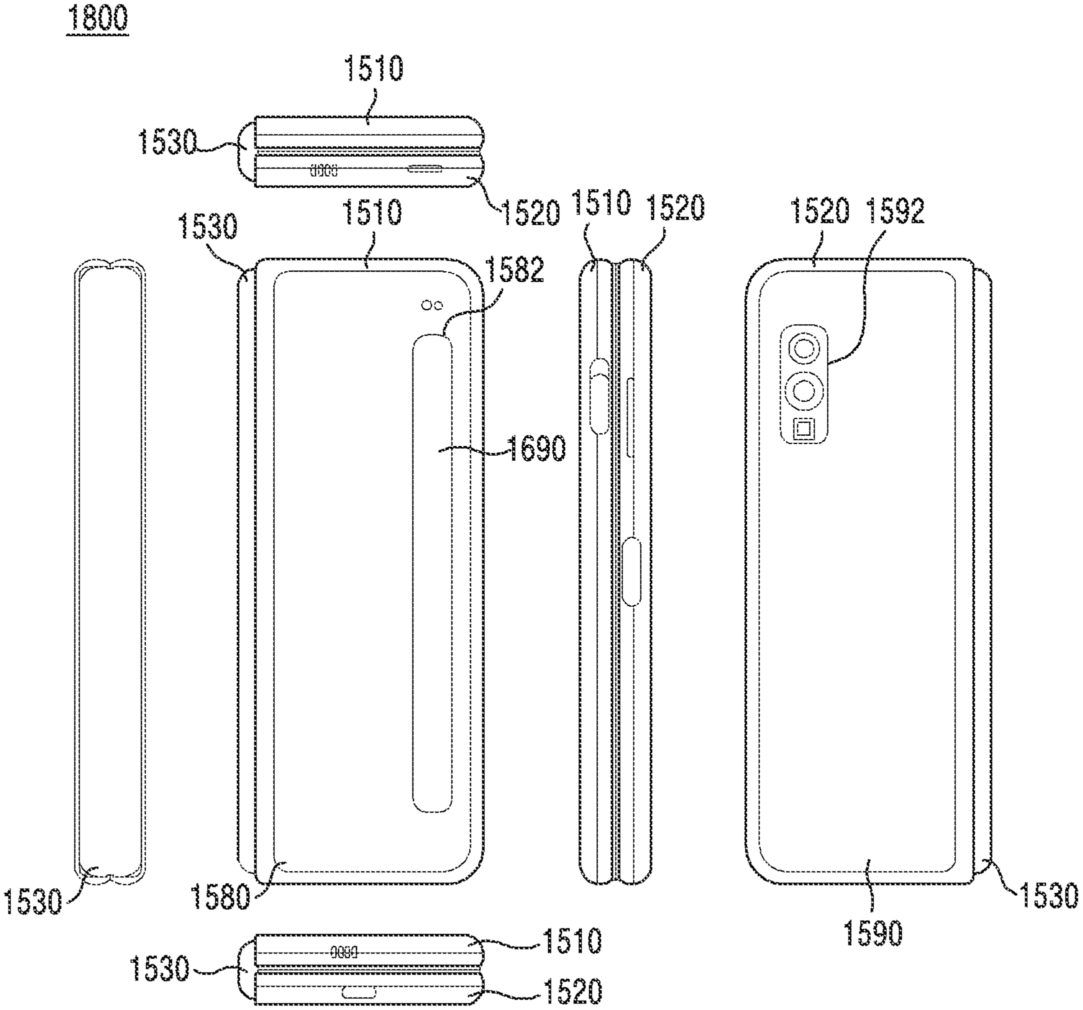
FIG. 15B is a diagram illustrating a folded state of an electronic device according to an embodiment of the disclosure.

Referring to FIGS. 15A and 15B, in an embodiment, an electronic device 1800 may include a foldable housing 1500, a hinge cover 1530 that covers a foldable portion of the foldable housing 1500, and a flexible or foldable display 1600 (hereinafter, abbreviated to the "display 1600") that is disposed in a space formed by the foldable housing 1500. In an embodiment, a surface on which the display 1600 is disposed is defined as a first surface or a front surface of the electronic device 1800. A surface opposite to the front surface is defined as a second surface or a rear surface of the electronic device 1800. A surface that surrounds a space between the front surface and the rear surface is defined as a third surface or a side surface of the electronic device 1800.

In an embodiment, the foldable housing 1500 may include a first housing structure 1510, a second housing structure 1520 including a sensor area 1524, a first back cover 1580, and a second back cover 1590. The foldable housing 1500 of the electronic device 1800 is not limited to the form and the coupling illustrated in FIGS. 15A and 15B and may be implemented by a combination and/or a coupling of other shapes or parts. In another embodiment, the first housing structure 1510 and the first back cover 1580 may be integrally formed with each other, and the second housing structure 1520 and the second back cover 1590 may be integrally formed with each other.

In an embodiment, the first housing structure 1510 and the second housing structure 1520 may be disposed on opposite sides of a folding axis (an axis A) and may have substantially symmetrical shapes with respect to the folding axis A. As will be described below, the angle or distance between the first housing structure 1510 and the second housing structure 1520 may vary depending on whether the electronic device 1800 is in a flat, folded, or intermediate state. In the illustrated embodiment, unlike the first housing structure 1510, the second housing structure 1520 may additionally include the sensor area 1524 in which various sensors are arranged, but may have a symmetrical shape in the other area.

In another embodiment, as illustrated in FIG. 15A, the first housing structure 1510 and the second housing structure 1520 may form a recess together in which the display 1600 is received. In the illustrated embodiment, due to the sensor area 1524, the recess may have two or more different widths in a direction perpendicular to the folding axis A.

For example, the recess may have (1) a first width w1 between a first portion 1510*a* of the first housing structure 1510 that is parallel to the folding axis A and a first portion 1520*a* of the second housing structure 1520 that is formed on the periphery of the sensor area 1524 and (2) a second width w2 formed by a second portion 1510*b* of the first housing structure 1510 and a second portion 1520*b* of the second housing structure 1520 that does not correspond to the sensor area 1524 and that is parallel to the folding axis A. The second width w2 may be formed to be longer than the first width w1. In other words, the first portion 1510*a* of the first housing structure 1510 and the first portion 1520*a* of the second housing structure 1520 that have asymmetrical shapes may form the first width w1 of the recess, and the second portion 1510*b* of the first housing structure 1510 and the second portion 1520*b* of the second housing structure 1520 that have symmetrical shapes may form the second width w2 of the recess. In an embodiment, the first portion 1520*a* and the second portion 1520*b* of the second housing structure 1520 may have different distances from the folding axis A. The widths of the recess are not limited to the illustrated examples. In various embodiments, the recess may have a plurality of widths by the form of the sensor area 1524 or by the portions of the first housing structure 1510 and the second housing structure 1520 that have asymmetrical shapes.

In still another embodiment, at least a part of the first housing structure 1510 and the second housing structure 1520 may be formed of metal or non-metal having strength selected to support the display 1600.

The sensor area 1524 may be formed to have a predetermined area adjacent to one corner of the second housing structure 1520. However, the arrangement, shape, and size of the sensor area 1524 are not limited to the illustrated example. In another embodiment, the sensor area 1524 may be provided in another corner of the second housing structure 1520 or in any area between an upper corner and a lower corner of the second housing structure 1520. In an embodiment, parts embedded in the electronic device 1800 to perform various functions may be exposed on the front surface of the electronic device 1800 though the sensor area 1524 or through one or more openings formed in the sensor area 1524. In various embodiments, the parts may include various types of sensors. The sensors may include, for example, at least one of a front camera, a receiver, or a proximity sensor.

In an embodiment, the first back cover 1580 may be disposed on one side of the folding axis A on the rear surface of the electronic device 1800 and may have, for example, a substantially rectangular periphery that is surrounded by the first housing structure 1510. Similarly, the second back cover 1590 may be disposed on an opposite side of the folding axis A on the rear surface of the electronic device 1800 and may have a periphery surrounded by the second housing structure 1520.

In another embodiment, the first back cover 1580 and the second back cover 1590 may have substantially symmetrical shapes with respect to the folding axis (the axis A). However, the first back cover 1580 and the second back cover 1590 do not necessarily have symmetrical shapes, and in another embodiment, the electronic device 1800 may include the first back cover 1580 and the second back cover 1590 in various shapes. In yet another embodiment, the first back cover 1580 may be integrally formed with the first housing structure 1510, and the second back cover 1590 may be integrally formed with the second housing structure 1520.

In still another embodiment, the first back cover 1580, the second back cover 1590, the first housing structure 1510, and the second housing structure 1520 may form a space in which various parts (e.g., a printed circuit board or a battery) of the electronic device 1800 are disposed. In an embodiment, one or more parts may be disposed or visually exposed on the rear surface of the electronic device 1800. For example, at least part of a sub-display 1690 may be visually exposed through a first rear area 1582 of the first back cover 1580. In another embodiment, one or more parts or sensors may be visually exposed through a second rear area 1592 of the second back cover 1590. In various embodiments, the sensors may include a proximity sensor and/or a rear camera.

Referring to FIG. 15B, the hinge cover 1530 may be disposed between the first housing structure 1510 and the second housing structure 1520 to hide internal parts (e.g., hinge structures). The hinge cover 1530 may be hidden by part of the first housing structure 1510 and part of the second housing structure 1520, or may be exposed to the outside, depending on a state (e.g., a flat state or a folded state) of the electronic device 1800.

For example, when the electronic device 1800 is in a flat state as illustrated in FIG. 15A, the hinge cover 1530 may be hidden by the first housing structure 1510 and the second housing structure 1520 and thus may not be exposed. In another example, when the electronic device 1800 is in a folded state (e.g., a fully folded state) as illustrated in FIG. 15B, the hinge cover 1530 may be exposed between the first housing structure 1510 and the second housing structure 1520 to the outside. In yet another example, when the electronic device 1800 is in an intermediate state in which the first housing structure 1510 and the second housing structure 1520 are folded with a certain angle, the hinge cover 1530 may be partially exposed between the first housing structure 1510 and the second housing structure 1520 to the outside. However, in this case, the exposed area may be smaller than that when the electronic device 1800 is in a fully folded state. In an embodiment, the hinge cover 1530 may include a curved surface.

The display 1600 may be disposed in the space formed by the foldable housing 1500. The display 1600 may be mounted in the recess formed by the foldable housing 1500 and may form almost the entire front surface of the electronic device 1800.

Accordingly, the front surface of the electronic device 1800 may include the display 1600, and a partial area of the first housing structure 1510 and a partial area of the second housing structure 1520 that are adjacent to the display 1600. In an embodiment, the rear surface of the electronic device 1800 may include the first back cover 1580, a partial area of the first housing structure 1510 that is adjacent to the first back cover 1580, the second back cover 1590, and a partial area of the second housing structure 1520 that is adjacent to the second back cover 1590.

The display 1600 may refer to a display, at least a partial area of which is able to be transformed into a flat surface or a curved surface. In an embodiment, the display 1600 may include a folding area 1603, a first area 1601 disposed on one side of the folding area 1603 (on a left side of the folding area 1603 illustrated in FIG. 15A), and a second area 1602 disposed on an opposite side of the folding area 1603 (on a right side of the folding area 1603 illustrated in FIG. 15A).

The areas of the display 1600 illustrated in FIG. 15A are illustrative, and the display 1600 may be divided into a plurality of (e.g., four or more, or two) areas according to a structure or function of the display 1600. In the embodiment illustrated in FIG. 15A, the areas of the display 1600 may be divided from each other by the folding area 1603 or the folding axis (the axis A) that extends in parallel to the y-axis. However, in another embodiment, the display 1600 may be divided into areas with respect to another folding area (e.g., a folding area parallel to the x-axis) or another folding axis (e.g., a folding axis parallel to the x-axis).

In an embodiment, the first area 1601 and the second area 1602 may have substantially symmetrical shapes with respect to the folding area 1603. However, unlike the first area 1601, the second area 1602 may include a notch 1604 that is cut according to the presence of the sensor area 1524, but in the other area, the second area 1602 may be symmetric to the first area 1601. In other words, the first area 1601 and the second area 1602 may each include a portion having a symmetrical shape and a portion having an asymmetrical shape.

Hereinafter, operations of the first housing structure 1510 and the second housing structure 1520 and the areas of the display 1600 according to states (e.g., a flat state and a folded state) of the electronic device 1800 will be described.

In an embodiment, when the electronic device 1800 is in a flat state (e.g., FIG. 15A), the first housing structure 1510 and the second housing structure 1520 may be arranged to face the same direction while forming an angle of 1680 degrees. The surface of the first area 1601 of the display 1600 and the surface of the second area 1602 thereof may face the same direction (e.g., face away from the front surface of the electronic device 1800) while forming an angle of 1680 degrees. The folding area 1603 may form the same plane together with the first area 1601 and the second area 1602.

In another embodiment, when the electronic device 1800 is in a folded state (e.g., FIG. 15B), the first housing structure 1510 and the second housing structure 1520 may be arranged to face each other. The surface of the first area 1601 of the display 1600 and the surface of the second area 1602 thereof may face each other while forming a narrow angle (e.g., an angle between 0 degrees and 10 degrees). At least part of the folding area 1603 may form a curved surface having a predetermined curvature.

In still another embodiment, when the electronic device 1800 is in an intermediate state (e.g., FIG. 15B), the first housing structure 1510 and the second housing structure 1520 may be arranged to have a certain angle therebetween. The surface of the first area 1601 of the display 1600 and the surface of the second area 1602 thereof may form an angle that is greater than that in the folded state and is smaller than that in the flat state. At least part of the folding area 1603 may form a curved surface having a predetermined curvature, and the curvature may be smaller than that in the folded state.

Figure 16:
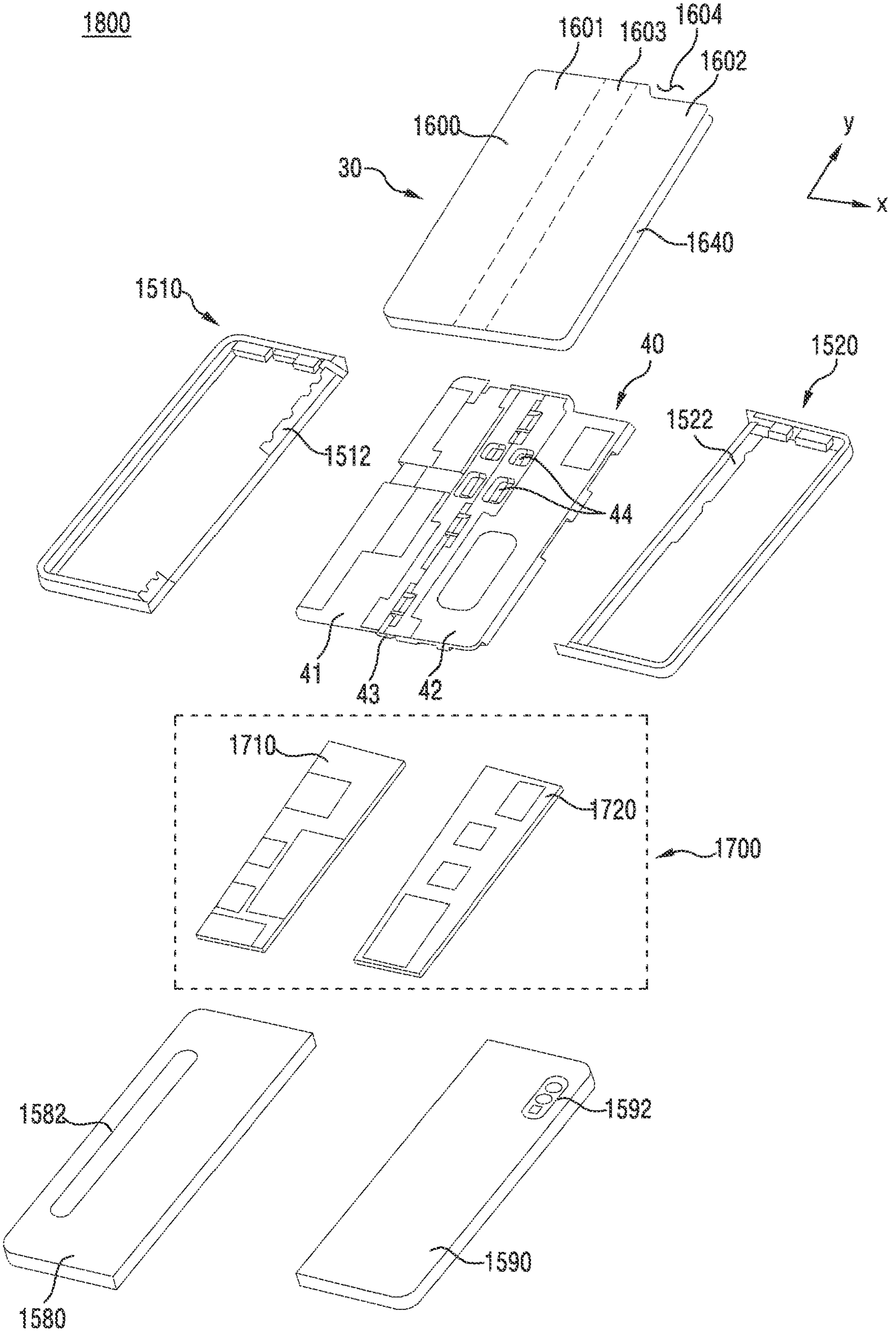
FIG. 16 is an exploded view illustrating an electronic device according to an embodiment of the disclosure.

FIG. 16 is an exploded view illustrating an electronic device according to an embodiment of the disclosure.

Referring to FIG. 16, in an embodiment, an electronic device 1800 may include a display unit 30, a bracket assembly 40, a substrate 1700, a first housing structure 1510, a second housing structure 1520, a first back cover 1580, and a second back cover 1590. In this disclosure, the display unit 30 may be referred to as the display module or the display assembly.

In an embodiment, the display unit 30 may include the display 1600 and at least one plate or layer 1640 on which the display 1600 is mounted. In an embodiment, the plate 1640 may be disposed between the display 1600 and the bracket assembly 40. The display 1600 may be disposed on at least part of one surface (e.g., an upper surface with respect to FIG. 16) of the plate 1640. The plate 1640 may be formed in a shape corresponding to the display 1600. For example, a partial area of the plate 1640 may be formed in a shape corresponding to the notch 1604 of the display 1600.

In another embodiment, the bracket assembly 40 may include a first bracket 41, a second bracket 42, hinge structures disposed between the first bracket 41 and the second bracket 42, the hinge cover 43 that covers the hinge structures when viewed from the outside, and a wiring member 44 (e.g., a flexible printed circuit (FPC)) that traverses the first bracket 41 and the second bracket 42.

In still another embodiment, the bracket assembly 40 may be disposed between the plate 1640 and the substrate 1700. For example, the first bracket 41 may be disposed between the first area 1601 of the display 1600 and a first substrate 1710. The second bracket 42 may be disposed between the second area 1602 of the display 1600 and a second substrate 1720.

In yet another embodiment, at least a part of the wiring member 44 and the hinge structures may be disposed inside the bracket assembly 40. The wiring member 44 may be arranged in a direction (e.g., the x-axis direction) across the first bracket 41 and the second bracket 42. The wiring member 44 may be arranged in a direction (e.g., the x-axis direction) that is perpendicular to a folding axis (e.g., the y-axis or the folding axis A of FIG. 15A) of the folding area 1603 of the electronic device 1800.

As mentioned above, the substrate 1700 may include the first substrate 1710 disposed at the first bracket 41 side and the second substrate 1720 disposed at the second bracket 42 side. The first substrate 1710 and the second substrate 1720 may be disposed in a space that is formed by the bracket assembly 40, the first housing structure 1510, the second housing structure 1520, the first back cover 1580, and the second back cover 1590. Parts for implementing various functions of the electronic device 1800 may be mounted on the first substrate 1710 and the second substrate 1720.

The first housing structure 1510 and the second housing structure 1520 may be assembled so as to be coupled to opposite sides of the bracket assembly 40 in the state in which the display unit 30 is coupled to the bracket assembly 40. As will be described herein, the first housing structure 1510 and the second housing structure 1520 may slide on the opposite sides of the bracket assembly 40 and may be coupled with the bracket assembly 40.

In an embodiment, the first housing structure 1510 may include a first rotation support surface 1512, and the second housing structure 1520 may include a second rotation support surface 1522 corresponding to the first rotation support surface 1512. The first rotation support surface 1512 and the second rotation support surface 1522 may include curved surfaces that correspond to curved surfaces included in the hinge cover 43.

In another embodiment, when the electronic device 1800 is in a flat state (e.g., the electronic device 1800 of FIG. 15A), the first rotation support surface 1512 and the second rotation support surface 1522 may cover the hinge cover 43 such that the hinge cover 43 is not exposed, or is exposed to a minimum, on the rear surface of the electronic device 1800. Meanwhile, when the electronic device 1800 is in a folded state (e.g., the electronic device 1800 of FIG. 15B), the first rotation support surface 1512 and the second rotation support surface 1522 may rotate along the curved surfaces included in the hinge cover 43, such that the hinge cover 43 is exposed on the rear surface of the electronic device 1800 to the maximum.

Figure 17A:
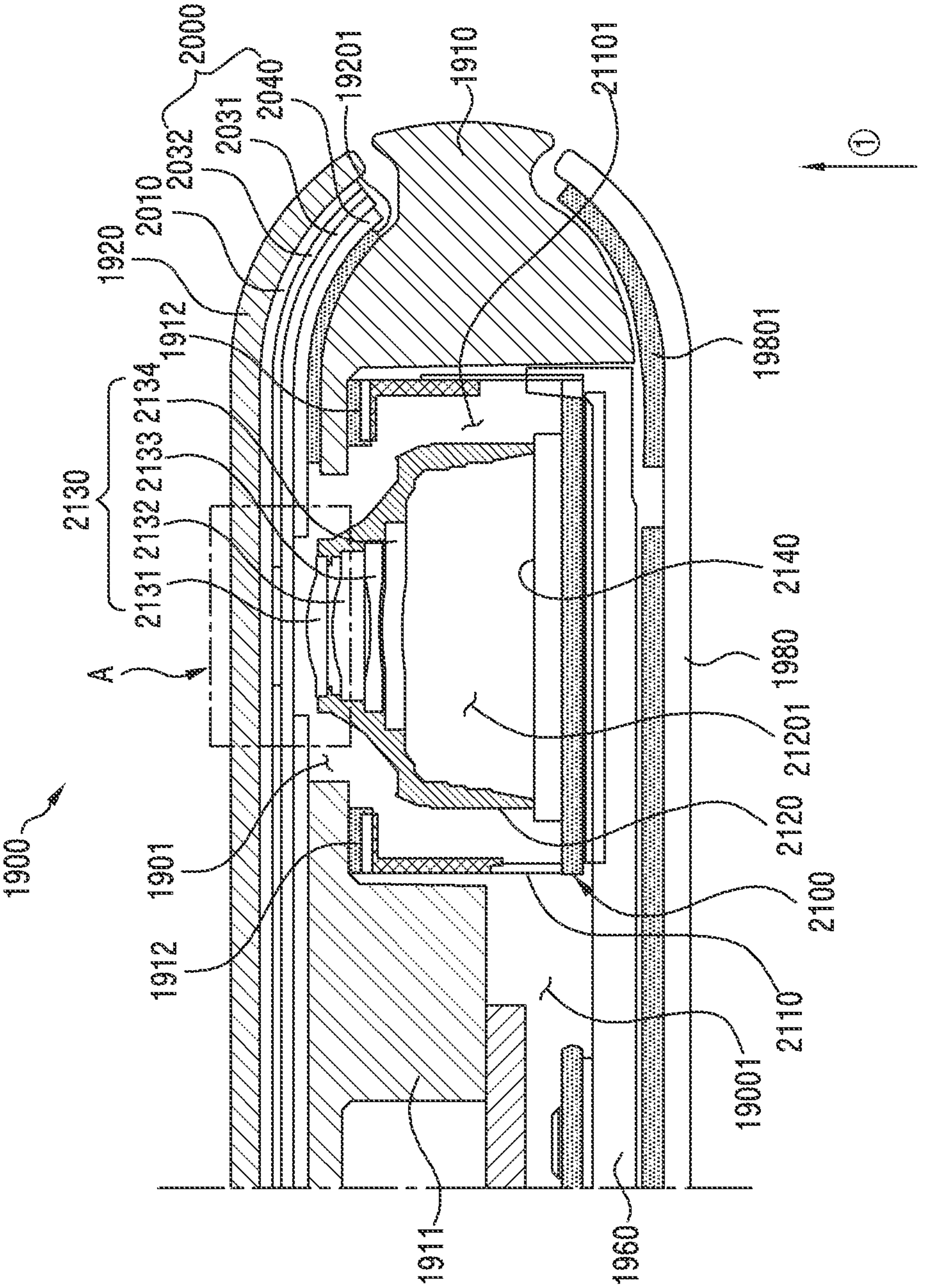
FIG. 17A is a cross-sectional view of an electronic device viewed in one direction according to an embodiment of the disclosure.
Figure 17B:
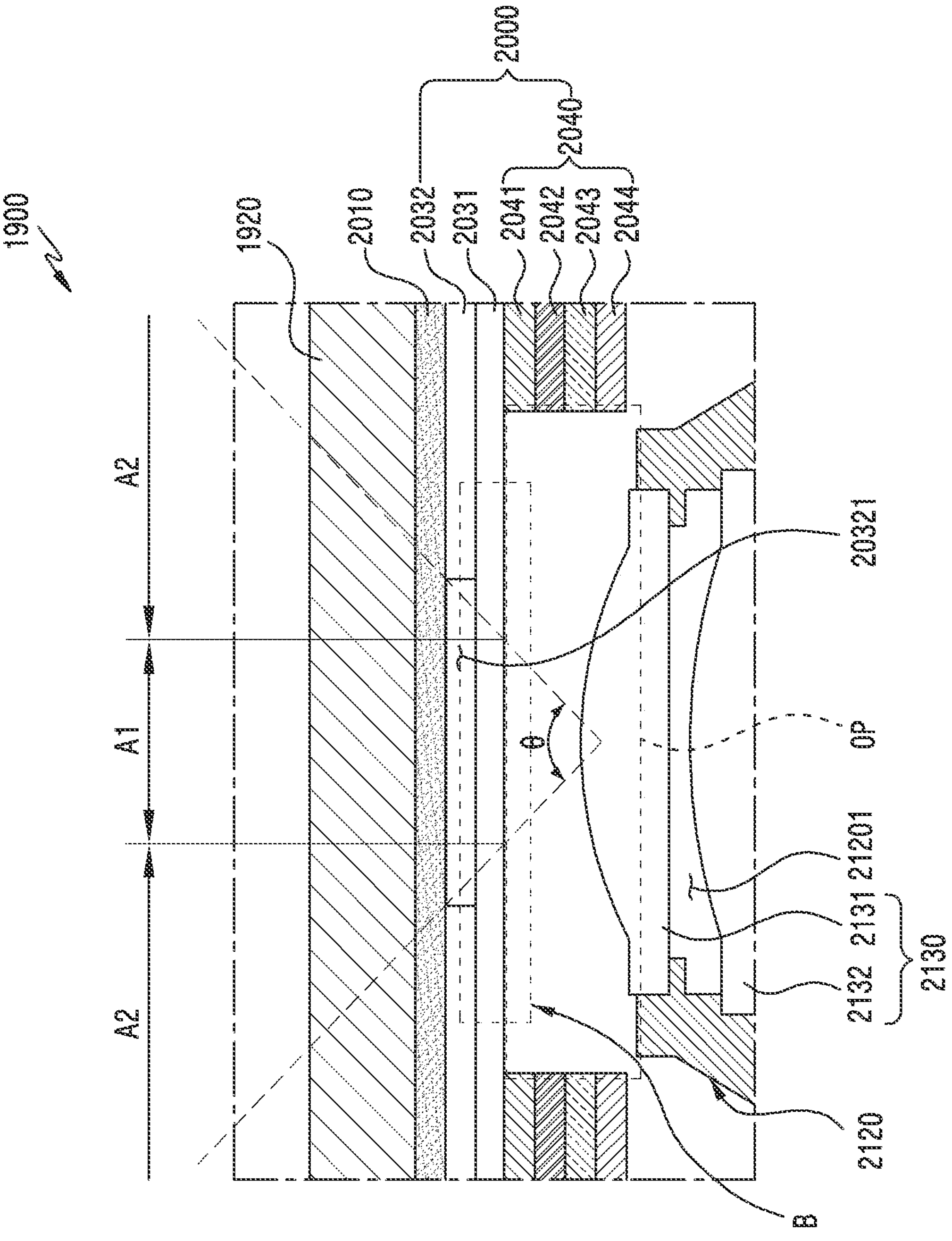
FIG. 17B is an enlarged view of an area of an electronic device according to an embodiment of the disclosure.

FIG. 17A is a cross-sectional view of an electronic device viewed in one direction according to an embodiment of the disclosure, and FIG. 17B is an enlarged view of one area of an electronic device according to an embodiment of the disclosure. The one direction of the electronic device may refer to the direction A-A' illustrated in FIG. 3, and the one area of the electronic device may refer to the area A illustrated in FIG. 17A.

Although a description with reference to FIGS. 17A and 17B will be made based on an example of an unbreakable (UB) type OLED display (e.g., a curved display), the disclosure is not limited thereto. The description with reference to FIGS. 17A and 17B may also be applied to a flat type display such as an OCTA (on-cell touch active matrix organic light-emitting diode (AOLED)).

Referring to FIG. 17A, an electronic device 1900 may include a front cover 1920 (e.g., a cover member, a front plate, a front window, or a first plate) facing in a first direction (direction ①), a rear cover 1980 (e.g., a rear cover member, a rear plate, a rear window, or a second plate) facing in a direction opposite the first direction, a side member 1910 surrounding a space 1900 between the front cover 1920 and the rear cover 1980. According to an embodiment, the electronic device 1900 may include a first waterproof member 19201 disposed between an auxiliary material layer 2040 and the side member 1910 of the display 2000. According to an embodiment, the electronic device 1900 may include a second waterproof member 19801 disposed between the side member 1910 and the rear cover 1980. The first waterproof member 19201 and the second waterproof member 19801 may prevent foreign substances or moisture from flowing into the inner space 19001 of the electronic device 1900. In various embodiments, the first waterproof member 19201 and the second waterproof member 19801 may be replaced with an adhesive member. In various embodiments, the waterproof member may be disposed in at least a portion of a mounting support structure between a camera device 2100 and the side member 1910.

According to various embodiments, the side member 1910 may further include a first support member 1911 at least partially extending to the inner space 19001 of the electronic device 1900. According to an embodiment, the first support member 1911 may be formed by being structurally coupled to the side member 1910. According to an embodiment, the first support member 1911 may support the camera device 2100 such that the camera device 2100 is aligned and disposed near the rear surface of the display panel 2031 through an opening (e.g., the opening OP in FIG. 17B) formed in the auxiliary material layer 2040 of the display 2000.

According to other embodiments, the camera device 2100 may include a camera housing 2110, a lens housing 2120 disposed in an inner space 21101 of the camera housing 2110 and at least partially protruding in the display direction (e.g., direction ①), a plurality of lenses (2130: 2131, 2132, 2133, and 2134) disposed at regular intervals in an inner space 21201 of the lens housing 2120, and at least one image sensor 2140 disposed in the inner space 21101 of the camera housing 2110 to obtain at least a portion of the light passing through the plurality of lenses 2130. According to an embodiment, if the camera device 2100 has an auto focus (AF) function, the lens housing 2120 may move by a predetermined driving unit in the camera housing 2110 such that a distance to the display panel 2031 varies. According to another embodiment, in relation to the AF function of the camera device 2100, the driving unit for changing the position of at least one of the plurality of lenses 2130 may be disposed. In another embodiment, the camera housing 2110 may be excluded from the camera device 2100, and the lens housing 2120 may be directly disposed on the first support member 1911 through a predetermined alignment process. According to yet another embodiment, in the case where the lens housing 2120 is disposed directly on the first support member 1911, the camera housing 2110 may be excluded to reduce the arrangement space of the camera device 2100, and the lens housing 2120 is may be attached to one side surface of the first support member 1911. According to still another embodiment, the camera device 2100 may be aligned through the through hole 1901 of the first support member 1911 and then attached to the rear surface of the first support member 1911 by an adhesive member 1912 (e.g., a bonding member or a tape member).

According to various embodiments, the display 2000 may include a touch panel, a POL 2032, a display panel 2031, a light blocking layer (e.g., the light blocking layer 2041 in FIG. 17B), and a buffer layer (e.g., the buffer layer 2042 in FIG. 17B), a digitizer, a functional member (e.g., the functional member 2043 in FIG. 17B), and/or a conductive member (e.g., the conductive member 2044 in FIG. 17B). According to an embodiment, the camera device 2100 may be supported by a second support member 1960 (e.g., a rear case) that is further disposed in the inner space 19001 of the electronic device 1900.

Referring to FIGS. 17A and 17B, the electronic device 1900 may include an adhesive layer 2010, a POL 2032, a display panel 2031, and an auxiliary material layer 2040 disposed between the front cover 1920 and the side member 1910 on the rear surface of the front cover 1920. In an embodiment, when the front cover 1920 is viewed from above, the POL 2032 may include an opening 20321 formed to improve optical transmittance of the camera device 2100. In various embodiments, a portion of the adhesive member 2010, disposed on the POL 2032, corresponding to the opening 20321 may be at least partially omitted. In other embodiments, the opening 20321 formed in the POL 2032 may be filled with a material (e.g., an index matching material) for matching a refractive index according to an increase in interfacial reflection. In another embodiment, the areas corresponding to the plurality of lenses 2130 of the POL 2032 may be configured to have high transmittance, instead of having the opening 20321 formed thereon. For example, at least a partial area (e.g., an area corresponding to the plurality of lenses 2130) of the POL 2032 may be formed of a material having a transmittance different from those of the remaining areas of the POL 2032 or may be configured as other members capable of increasing transmittance. In another embodiment, when the front cover 1920 is viewed from above, the auxiliary material layer 2040 may include an opening OP formed in an area that at least partially overlaps the plurality of lenses 2130. In yet another embodiment, the opening OP formed in the auxiliary material layer 2040 may be configured as a single opening OP in such a way that an opening formed in the light blocking layer 2041, an opening formed in the buffer layer 2042, an opening formed in the functional member 2043, and an opening formed in the conductive member 2044 overlap each other. According to other embodiments, the above-described openings may have different sizes corresponding to the shape of the camera device 2100.

According to various embodiments, the display panel 2031 may include active areas (area A1 and area A2). According to an embodiment, the display panel 2031 may include a transmission area A1 that overlaps the angle of view θ of the camera device 2100 disposed under the display panel 2031 when the display 2000 is viewed from above. According to another embodiment, the transmission area A1 may be formed to have a higher transmittance than the peripheral active area A2. For example, the transmission area A1 may be formed to have a transmittance in a range of 5% to 20% by rearrangement of a plurality of pixels and/or wires in the display panel 2031. According to various embodiments, the transmission area A1 may include an opaque layer (e.g., the opaque layer 2060 in FIG. 17C) including a plurality of openings (e.g., the openings 2061 in FIG. 17C) formed under the display panel 2031. According to an embodiment, the transmittance of the transmission area A1 may be determined by adjusting at least one of the shapes, sizes, arrangement density, and/or arrangement intervals of the plurality of openings 2061 included in the opaque layer 2060.

Figure 17C:
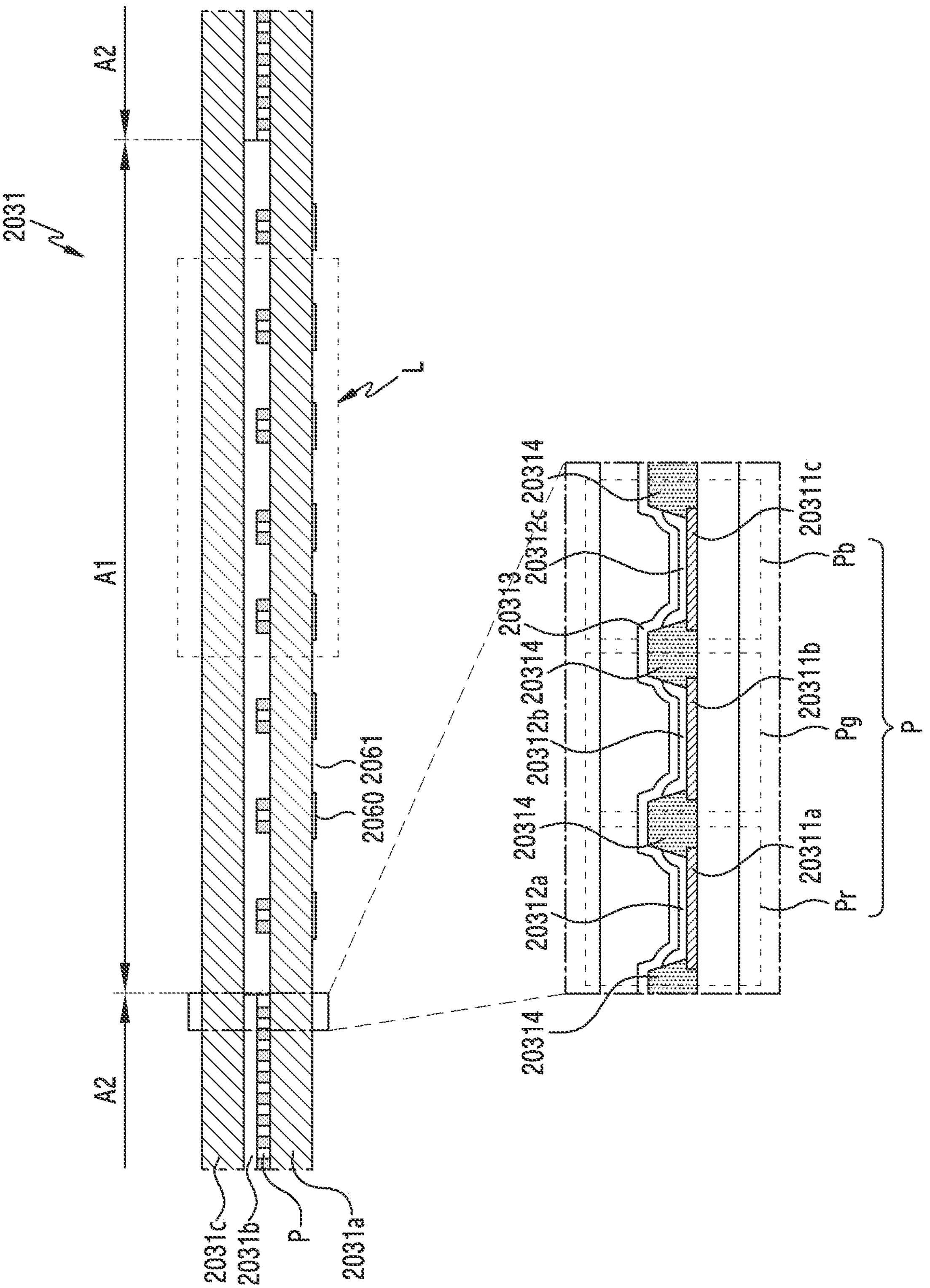
FIG. 17C is an enlarged view of another area of an electronic device according to an embodiment of the disclosure.

FIG. 17C is an enlarged view of another area of an electronic device according to an embodiment of the disclosure. The another area of electronic device may refer to the area B shown in FIG. 17B.

Referring to FIG. 17C, the display panel 2031 may include a substrate layer 2031*a*, an intermediate layer 2031*b* stacked on the substrate layer 2031*a*, and an encap layer 2031*c* stacked on the intermediate layer 2031*b*. In an embodiment, the display panel 2031 may include a plurality of pixels P in which a first sub-pixel region (Pr: pixel red), a second sub-pixel region (Pg: pixel green), and a third sub-pixel region (Pb: pixel blue) are defined as one pixel P. According to an embodiment, the area in which the plurality of pixels P are disposed may correspond to the active area of the display panel 2031.

According to various embodiments, the display panel 2031 may include a first pixel electrode 20311*a*, a second pixel electrode 20311*b*, and a third pixel electrode 20311*c* disposed on the substrate layer 2031*a* so as to correspond to the first sub-pixel region Pr, the second sub-pixel region Pg, and the third sub-pixel region Pb in the intermediate layer 2031*b*. In an embodiment, the display panel 2031 may include a first organic material layer 20312*a*, a second organic material layer 20312*b*, and a third organic material layer 20312*c* disposed on the first pixel electrode 20311*a*, the second pixel electrode 20311*b*, and the third pixel electrode 20311*c*, respectively, in the intermediate layer 2031*b*. In another embodiment, the first sub-pixel region Pr, the second sub-pixel region Pg, and the third sub-pixel region Pb may be partitioned by pixel defining layers 20314 made of an insulating material. A counter electrode 20313 may be commonly disposed on the first organic material layer 20312*a*, the second organic material layer 20312*b*, and the third organic material layer 20312*c*. In yet another embodiment, the first pixel electrode 20311*a*, the second pixel electrode 20311*b*, and the third pixel electrode 20311*c* may include a reflective electrode including a reflective layer.

According to various embodiments, the first organic material layer 20312*a*, the second organic material layer 20312*b*, and the third organic material layer 20312*c* may include organic light-emitting layers emitting light of a first color, light of a second color, and light of a third color, respectively. According to an embodiment, the organic light-emitting layer may be disposed between a pair of common layers that are vertically stacked. According to another embodiment, one common layer may include a hole injection layer (HIL) and/or a hole transport layer (HTL). According to yet another embodiment, the remaining one common layer may include an electron transport layer (ETL) and/or an electron injection layer (EIL). According to other embodiments, the pair of common layers may include an organic light-emitting layer and may further include various functional layers. In an embodiment, the first color, the second color, and the third color may include red, green, and blue, respectively. In another embodiment, in order for the organic light-emitting layer to emit white light, a combination of various colors may be used in addition to a combination of red, green, and blue.

According to various embodiments, the counter electrode 20313 may be configured as a transparent or translucent electrode, may include one or more materials selected from silver (Ag), aluminum (Al), magnesium (Mg), lithium (Li), calcium (Ca), copper (Cu), LiF/Ca, LiF/Al, MgAg, and CaAg, and may be formed as a thin film having a thickness of several to several tens of mm. According to an embodiment, light emitted from the first organic light-emitting layer, the second organic light-emitting layer, and the third organic light-emitting layer respectively included in the first organic material layer 20312*a*, the second organic material layer 20312*b*, and the third organic material layer 20312*c* may travel toward the counter electrode 20313 directly or by being reflected from the first pixel electrode 20311*a*, the second pixel electrode 20311*b*, and the third pixel electrode 20311*c*.

According to various embodiments, the substrate layer 2031*a* may include an electrical connection member electrically connected to each of the first pixel electrode 20311*a*, the second pixel electrode 20311*b*, and the third pixel electrode 20311*c*. In an embodiment, the electrical connection member may include a thin film transistor (TFT) or a low-temperature passivation transistor (LTPS). In another embodiment, the protective layer 2031*c* may be disposed on the counter electrode 20313 to protect the counter electrode 20313. According to various embodiments, the display panel 2031 may further include a base layer disposed below the substrate layer 2031*a*. In yet another embodiment, the substrate layer 2031*a* and/or the base layer may include a transparent insulating substrate. The substrate layer 2031*a* and/or the base layer may be formed of a glass substrate, a quartz substrate, or a transparent resin substrate. The transparent resin substrate may include a polyimide-based resin, an acryl-based resin, a polyacrylate-based resin, a polycarbonate-based resin, a polyether-based resin, a sulfonic acid-based resin, or a polyethyleneterephthalate-based resin.

According to various embodiments, the display panel 2031 may include a plurality of pixels P that are rearranged in the intermediate layer 2031*b* between the substrate layer 2031*a* and the protective layer 2031*c* corresponding to the transmission area A1 to have a lower arrangement density than the peripheral active area A2. In this case, the intermediate layer 2031*b* corresponding to the transmission area A1 may remain or may be removed. According to an embodiment, the display panel 2031 may include an opaque layer 2060 disposed under (e.g., on the rear surface) of the display panel 2031 so as to correspond to the transmission area A1. According to another embodiment, the opaque layer 2060 may include a colored (e.g., black) metal layer. In various embodiments, at least a portion of the opaque layer 2060 may be disposed in a boundary area between the transmission area A1 and the peripheral active area A2. According to yet another embodiment, the metal layer may be formed on the rear surface of the display panel 2031 through a deposition process. According to still another embodiment, the opaque layer 2060 may include a plurality of openings 2061, and transmittance of the transmission area A1 may be determined by adjusting the shapes, sizes, arrangement density, and/or arrangement intervals of the plurality of openings 2061. In an embodiment, the plurality of openings 2061 may be formed to have the same or different shapes, sizes, arrangement structures, and/or arrangement intervals. In another embodiment, in the transmission area A1, a plurality of pixels P and/or a plurality of wires included in the display panel 2031 may be disposed to overlap an area (e.g., a non-transmission area) where a plurality of openings 2061 is not formed when the display panel 2031 is viewed from above. According to another embodiment, in the transmission area A1, the plurality of pixels P and/or the plurality of wires may be disposed to at least partially overlap the plurality of openings 2061 when the display panel 2031 is viewed from above.

According to various embodiments, the display panel 2031 may have a transmittance corresponding to a pixel arrangement density in the range of about 100 ppi (pixel per inch) to 300 ppi through the plurality of openings 2061 in the transmission area A1. According to an embodiment, the display panel 2031 may have, in the transmission area A1, a transmittance that exceeds the transmittance of the peripheral active area A2 through the plurality of openings 2061 and equal to or less than a transmittance corresponding to the pixel arrangement density at which one pixel is disposed in an area where 16 pixels are to be disposed. According to another embodiment, the display panel 2031 may have, in the transmission area A1, a transmittance corresponding to the pixel arrangement density at which one pixel is disposed in an area where four pixels are to be disposed through the plurality of openings 2061. According to yet another embodiment, the display panel 2031 may be configured, in the transmission area A1, such that a ratio of a transmission area formed through the plurality of openings 2061 to a non-transmission area formed by the opaque layer 2060 (e.g., transmission area/non-transmission area) includes a range of about 1 to 500.

Hereinafter, another example of an electronic device structure to which various embodiments of the disclosure may be applied will described with reference to FIGS. 18A, 18B, and 18C.

Figure 18A:
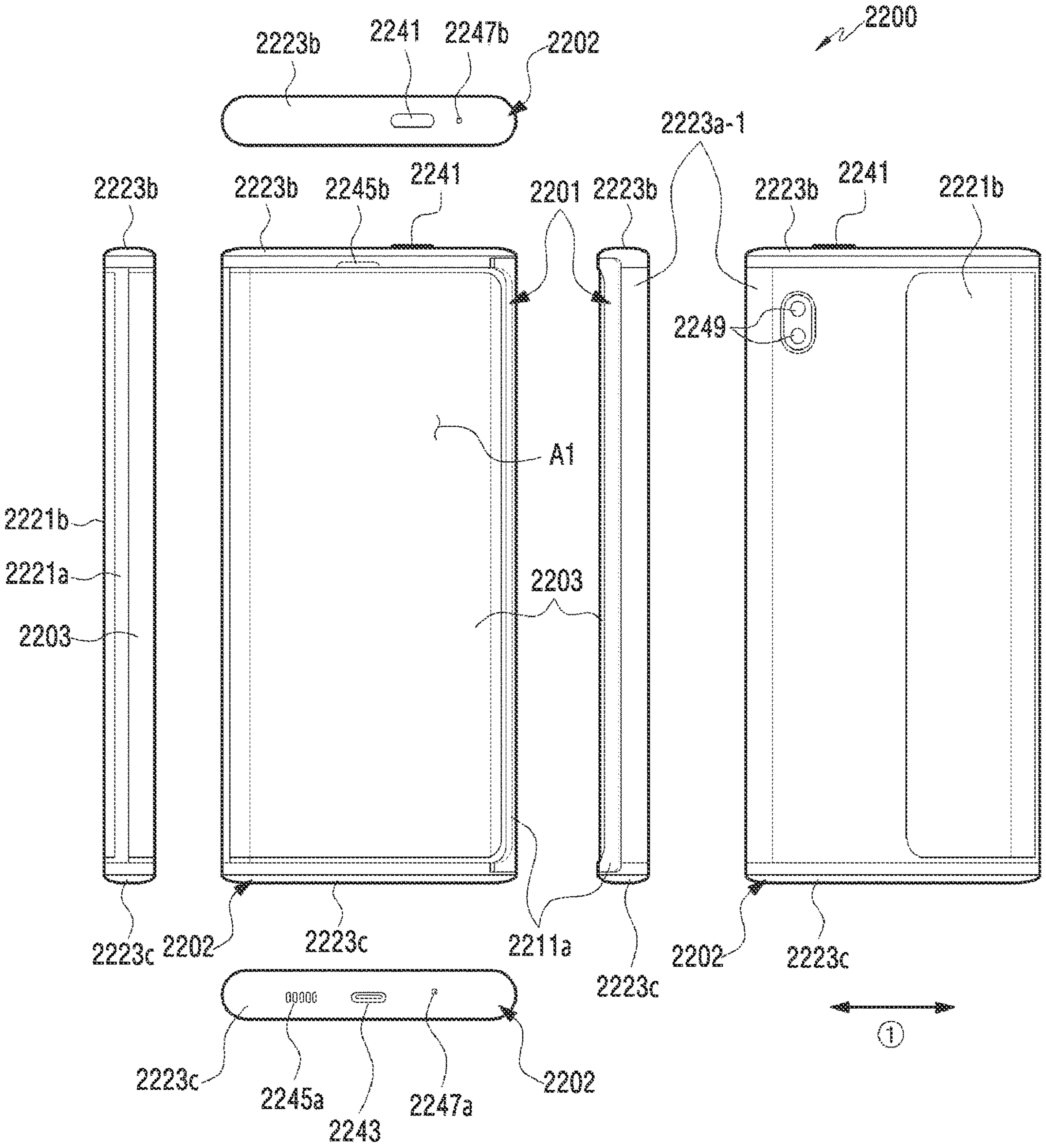
FIG. 18A is a diagram illustrating a closed state of an electronic device according to an embodiment of the disclosure.
Figure 18B:
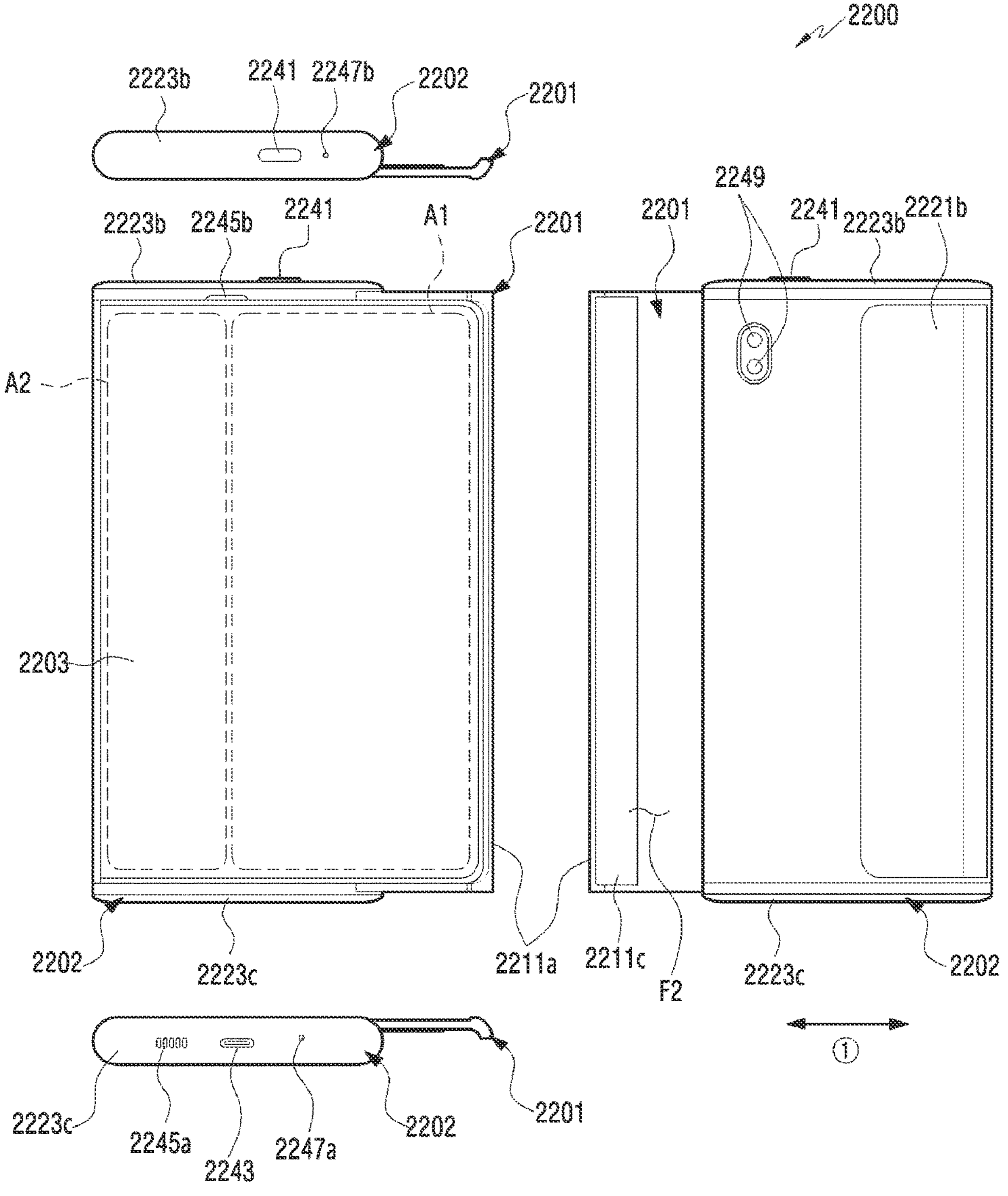
FIG. 18B is a diagram illustrating an open state of an electronic device according to an embodiment of the disclosure.

FIG. 18A is a diagram illustrating a closed state of an electronic device according to an embodiment of the disclosure, and FIG. 18B is a diagram illustrating an open state of an electronic device according to an embodiment of the disclosure.

Referring to FIGS. 18A and 18B, an electronic device 2200 may have a closed state in which a first structure 2201 is closed with respect to a second structure 2202 or have an open state in which the first structure 2201 is open with respect to the second structure 2202. In an embodiment, the electronic device 2200 may include a first structure 2201 and a second structure 2202 movably disposed in the first structure 2201. In various embodiments, the first structure 2201 may be disposed to slide on the second structure 2202. According to an embodiment, the first structure 2201 may be disposed to reciprocate by a predetermined distance in the illustrated direction ① relative to the second structure 2202.

According to various embodiments, the first structure 2201 may be referred to as a first housing, a slide part, or a slide housing, and may be disposed to reciprocate on the second structure 2202. In other embodiments, the second structure 2202 may be referred to as a second housing, a main part, or a main housing, and may accommodate various electronic components such as a main circuit board or a battery. A portion (e.g., the first region A1) of the display 2203 may be seated on the first structure 2201. Another part (e.g., the second region A2) of the display 2203 may be received inside the second structure 2202 (e.g., a slide-in operation) or exposed to the outside of the second structure 2202 (e.g., a slide-out operation) as the first structure 2201 moves (e.g., slides) relative to the second structure 2202.

According to various embodiments, the first structure 2201 may include a first plate 2211*a* (e.g., a slide plate) and include a first surface (e.g., F1 in FIG. 18C) formed to include at least a portion of the first plate 2211*a* and a second surface F2 facing in the opposite direction of the first surface F1. In an embodiment, the second structure 2202 may include a second plate (e.g., 2221*a* in FIG. 18C) (e.g., a rear case), a first side wall 2223*a* extending from the second plate 2221*a*, a second side wall 2223*b* extending from the first side wall 2223*a* and the second plate 2221*a*, a third side wall 2223*c* extending from the first side wall 2223*a* and the second plate 2221*a* and parallel to the second side wall 2223*b*, and a rear plate 2221*b* (e.g., a rear window). In other embodiments, the second side wall 2223*b* and the third side wall 2223*c* may be formed perpendicular to the first side wall 2223*a*. In another embodiment, the second plate 2221*a*, the first side wall 2223*a*, the second side wall 2223*b*, and the third side wall 2223*c* may be formed such that one side (e.g., a front face) of the second structure 2202 is open to receive (or enclose) at least a portion of the first structure 2201. For example, the first structure 2201 may be coupled to the second structure 2202 so as to be at least partially enclosed thereby, thereby sliding in a direction parallel to the first surface F1 or the second surface F2, for example, in the direction ①), while being guided by the second structure 2202.

According to various embodiments, the second side wall 2223*b* or the third side wall 2223*c* may be omitted. In an embodiment, the second plate 2221*a*, the first side wall 2223*a*, the second side wall 2223*b*, and/or the third side wall 2223*c* may be formed in separate structures and then coupled or assembled with each other. In another embodiment, the rear plate 2221*b* may be coupled to enclose at least a portion of the second plate 2221*a*. In various embodiments, the rear plate 2221*b* may be formed to be substantially integral with the second plate 2221*a*. In yet another embodiment, the second plate 2221*a* or the rear plate 2221*b* may cover at least a portion of the flexible display 2203. The flexible display 2203 may be at least partially received inside the second structure 2202, and the second plate 2221*a* or the rear plate 2221*b* may cover a portion of the flexible display 2203 received inside the second structure 2202.

According to various embodiments, the first structure 2201 may move in a first direction (e.g., the direction CO parallel to the second plate 2221*a* and the second side wall 2223*b* relative to the second structure 2202 between an open state and a closed state such that the first structure 2201 is placed at a first distance from the first side wall 2223*a* in the closed state and such that the first structure 2201 is placed at a second distance, which is greater than the first distance, from the first side wall 2223*a* in the open state. In other embodiments, the first structure 2201 may be positioned to enclose a portion of the first side wall 2223*a* in the closed state.

According to various embodiments, the electronic device 2200 may include at least one of a display 2203 (e.g., a flexible display), a key input device 2241, a connector hole 2243, audio modules 2245*a*, 2245*b*, 2247*a*, and 2247*b*, and a camera module 2249. Although not shown, the electronic device 2200 may further include an indicator (e.g., an LED device) or various sensor modules.

According to various embodiments, the display 2203 may include a first region A1 and a second region A2. In an embodiment, the first region A1 may be disposed on the first surface F1 so as to extend substantially across at least a portion of the first surface F1. The second region A2 may extend from the first region A1 and may be inserted or received inside the second structure 2202 or exposed to the outside of the second structure 2202 according to the sliding movement of the first structure 2201. As will be described later, the second region A2 may move while being substantially guided by a roller (e.g., 2251 in FIG. 18C) mounted to the second structure 2202 so as to be received inside the second structure 2202 or exposed to the outside thereof. For example, while the first structure 2201 slides, a portion of the second region A2 may be deformed into a curved shape at a position corresponding to the roller 2251.

According to other embodiments, if the first structure 2201 moves from the closed state to the open state, the second region A2 of the display 2203 may be gradually exposed to the outside of the second structure 2202 to form substantially a plane together with the first region A1 when viewed from above of the first plate 2211*a*. In an embodiment, the display 2203 may be connected to at least one of a touch sensing circuit, a pressure sensor capable of measuring the intensity (pressure) of a touch, and/or a digitizer detecting a magnetic-field type stylus pen or may be disposed adjacent thereto. In an embodiment, the second region A2 of the display 2203 may be at least partially received inside the second structure 2202, and a portion of the second region A2 may be exposed to the outside even in the closed state of the electronic device 2200. In various embodiments, a portion of the exposed second region A2 may be position on the roller 2251, irrespective of the closed state or open state of the electronic device 2200, so that a portion of the second region A2 may maintain a curved shape at a position corresponding to the roller 2251.

In an embodiment, the key input device 2241 may be disposed on the second side wall 2223*b* or the third side wall 2223*c* of the second structure 2202. In another embodiment, the key input device 2241 may be excluded from the electronic device 2200 or at least one key input device may be further included depending on the appearance of the electronic device 2200 or the state of using the electronic device 2200. According to various embodiments, the electronic device 2200 may include a key input device that is not shown, for example, a home key button or a touch pad disposed around the home key button. According to another embodiment, at least a part of the key input device 2241 may be disposed to be located in one area of the first structure 2201.

According to various embodiments, the connector hole 2243 may be omitted depending on the embodiment and receive a connector (e.g., a USB connector) for transmitting and receiving power and/or data to and from an external electronic device. Although not shown, the electronic device 2200 may include a plurality of connector holes 2243, and some of the plurality of connector holes 2243 may function as connector holes for transmitting and receiving audio signals to and from an external electronic device. Although the connector hole 2243 is illustrated as being disposed on the third side wall 2223*c*, the connector hole 2243 may be disposed on the first side wall 2223*a* or the second side wall 2223*b*.

According to other embodiments, the audio modules 2245*a*, 2245*b*, 2247*a*, and 2247*b* may include at least one of speaker holes 2245*a* and 2245*b* and microphone holes 2247*a* and 2247*b*. One of the speaker holes 2245*a* and 2245*b* may function as a receiver hole for a voice call, and the other may function as an external speaker hole. A microphone for obtaining an external sound may be disposed inside the microphone holes 2247*a* and 2247*b*, and a plurality of microphones may be disposed to detect the direction of sound in various embodiments. In various embodiments, the speaker holes 2245*a* and 2245*b* and the microphone holes 2247*a* and 2247*b* may be implemented as a single hole, or a speaker (e.g., a piezo speaker) may be provided without the speaker holes 2245*a* and 2245*b*. According to an embodiment, some speaker holes 2245*a* (e.g., a receiver hole for a voice call) may be disposed in the first structure 2201, and other speaker holes 2245*b* or microphone holes 2247*a* and 2247*b* may be disposed in the second structure 2202 (e.g., one of the side surfaces 2223*a*, 2223*b*, and 2223*c*).

In an embodiment, the camera module 2249 may be provided in the second structure 2202 and may photograph a subject in the opposite direction of the first region A1 of the display 2203. The electronic device 2200 may include a plurality of camera modules 2249. For example, the electronic device 2200 may include a wide-angle camera, a telephoto camera, or a close-up camera, and according to an embodiment, the electronic device 200 may further include at least one of an infrared projector and at least a receiver to measure the distance to the subject. In another embodiment, the camera module 2249 may include at least one of one or more lenses, an image sensor, and an image signal processor. Although not shown, according to various embodiments, the electronic device 2200 may further include a camera module (e.g., a front camera) for photographing a subject in the opposite direction of the first region A1 of the display 2203. The front camera may be disposed around the first region (A1) or in an area overlapping the display 2203 and may photograph a subject by passing through the display 2203 in the case where it is disposed in the area overlapping the display 2203.

According to various embodiments, an indicator (not shown) of the electronic device 2200 may be disposed in the first structure 2201 or the second structure 2202 and include a light-emitting diode to provide state information of the electronic device 2200 using a visual signal. A sensor module (not shown) of the electronic device 2200 may produce an electrical signal or data value corresponding to an internal operating state of the electronic device 2200 or an external environmental state of the electronic device 2200. The sensor module may include, for example, at least one of a proximity sensor, a fingerprint sensor, and a biometric sensor (e.g., an iris recognition sensor, a face recognition sensor, and an HRM sensor). Alternatively, the sensor module may further include at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, and an illuminance sensor.

Figure 18C:
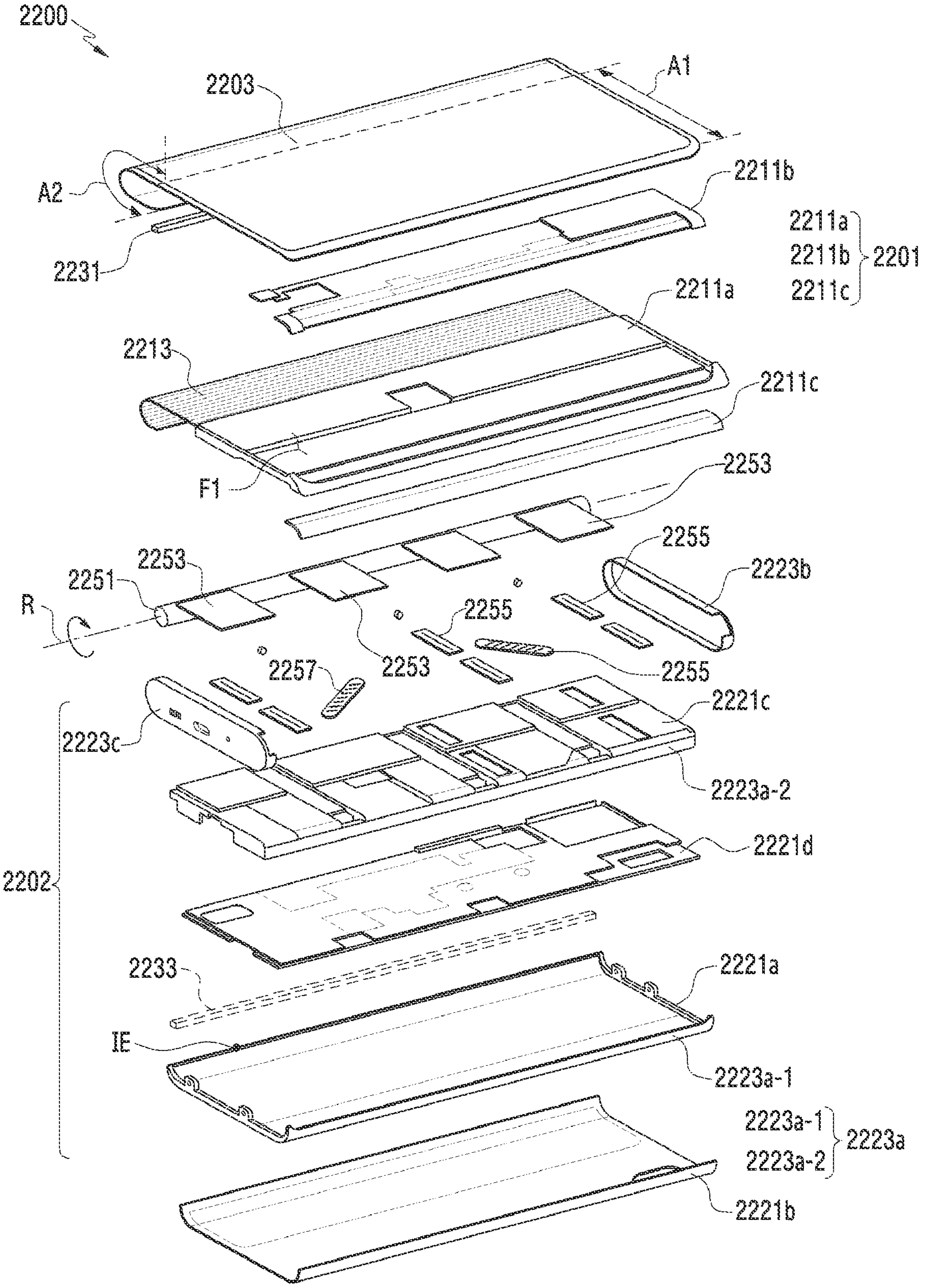
FIG. 18C is an exploded view of an electronic device according to an embodiment of the disclosure.

FIG. 18C is an exploded view of an electronic device according to an embodiment of the disclosure.

Referring to FIG. 18C, an electronic device 2200 may include at least one of a first structure 2201, a second structure 2202 (e.g., a housing), a display 2203 (e.g., a flexible display), and a guide member (e.g., a roller 2251), a support sheet 2253, and a multi-joint hinge structure 2213. A portion (e.g., a second region A2) of the display 2203 may be received inside the second structure 2202 while being guided by the roller 2251. According to various embodiments, the first structure 2201 may include at least one of a first plate 2211*a* (e.g., a slide plate), a first bracket 2211*b* mounted to the first plate 2211*a*, and a second bracket 2211*c*. At least one of the first plate 2211*a*, the first bracket 2211*b*, and the second bracket 2211*c* may be formed of a metal material or a non-metal material (e.g., polymer). The first plate 2211*a* may be mounted to the second structure 2202 and may reciprocate linearly in one direction (e.g., the direction ① in FIGS. 18A and 18B) while being guided by the second structure 2202. In an embodiment, the first bracket 2211*b* may be coupled to the first plate 2211*a* to form a first surface F1 of the first structure 2201 together with the first plate 2211*a*. A first region A1 of the display 2203 may be substantially mounted on the first surface F1 so as to remain flat. The second bracket 2211*c* may be coupled to the first plate 2211$a$ to form a second surface F2 of the first structure 2201 together with the first plate 2211$a$. According to an embodiment, at least one of the first bracket 2211$b$ and the second bracket 2211$c$ may be integrally formed with the first plate 2211$a$. The first structure 2201 or the first plate 2211$a$ may be coupled to the second structure 2202 to slide relative to the second structure 2202.

According to various embodiments, the multi-joint hinge structure 2213 may include a plurality of bars or rods and may be connected to one end of the first structure 2201. For example, as the first structure 2201 slides, the multi-joint hinge structure 2213 may move relative to the second structure 2202 to be substantially received inside the second structure 2202 in a closed state (e.g., the state of the electronic device 2200 in FIG. 18A). According to other embodiments, even if the electronic device 2200 is in the closed state, a part of the multi-joint hinge structure 2213 may not be received inside the second structure 2202. For example, even in the closed state of the electronic device 2200, a part of the multi-joint hinge structure 2213 may be positioned outside the second structure 2202 so as to correspond to the roller 2251. The plurality of rods may extend in a straight line to be disposed parallel to a rotation axis R of the roller 2251, and may be arranged along a direction perpendicular to the rotation axis R (e.g., a direction in which the first structure 2201 slides).

According to still other embodiments, the plurality of rods may rotate around other rods adjacent thereto while remaining parallel to the other adjacent rods. Based on this, as the first structure 2201 slides, the plurality of rods may be arranged to form a curved surface or may be arranged to form a flat surface. As the first structure 2201 slides, the multi-joint hinge structure 2213 may form a curved surface at a portion facing the roller 2251 and form a flat surface at a portion not facing the roller 2251. In an embodiment, the second region A2 of the display 2203 may be mounted or supported on the multi-joint hinge structure 2213 and exposed to the outside of the second structure 2202 together with the first region A1 in an open state (e.g., the state of the electronic device 2200 in FIG. 18B). In the state in which the second region A2 is exposed to the outside of the second structure 2202, the multi-joint hinge structure 2213 may form substantially a flat surface, thereby supporting or maintaining the second region A2 in a flat state.

According to other embodiments, the second structure 2202 (e.g., a housing) may include a second plate 2221$a$ (e.g., a rear case), a printed circuit board (not shown), a rear plate 2221$b$, and a third plate 2221$c$ (e.g., a front case), and a support member 2221$d$. In an embodiment, the second plate 2221$a$ may be disposed in the opposite direction of the first surface F1 of the first plate 2211$a$ and may substantially form the appearance of the second structure 2202 or the electronic device 2200. In another embodiment, the second structure 2202 may include a first side wall 2223$a$ extending from the second plate 2221$a$, a second side wall 2223$b$ extending from the second plate 2221$a$ to be substantially perpendicular to the first side wall 2223$a$, and a third side wall 2223$c$ extending from the second plate 2221$a$ to be substantially perpendicular to the first side wall 2223$a$ and parallel to the second side wall 2223$b$. In an embodiment, at least one of the second side wall 2223$b$ and the third side wall 2223$c$ may be manufactured as a separate component and mounted or assembled to the second plate 2221$a$. In another embodiment, at least one of the second side wall 2223$b$ and the third side wall 2223$c$ may be integrally formed with the second plate 2221$a$. The second structure 2202 may accommodate an antenna for proximity wireless communication, an antenna for wireless charging, or an antenna for magnetic secure transmission (MST) in a space that does not overlap the multi-joint hinge structure 2213.

According to various embodiments, the rear plate 2221$b$ may be coupled to the outer surface of the second plate 2221$a$ or may be formed integrally with the second plate 2221$a$. In an embodiment, the second plate 2221$a$ may be formed of a metal or a polymer material, and the rear plate 2221$b$ may be formed of a material such as metal, glass, synthetic resin, or ceramic, thereby providing a decorative effect for the exterior of the electronic device 2200. In an embodiment, at least one of the second plate 2221$a$ and the rear plate 2221$b$ may be formed of a material that at least partially transmits light. Based on this, in the state in which a portion (e.g., the second region A2) of the display 2203 is received inside the second structure 2202, the electronic device 2200 may output visual information using the portion (e.g., an auxiliary display area) of the received display 2203, which is received inside the second structure 2202. The portion (e.g., an auxiliary display area) of the display 2203 may output visual information and provide the same to the outside of the second structure 2202 while being received inside the second structure 2202.

According to various embodiments, the third plate 2221$c$ may be formed of a metal or polymer material and coupled to at least one of the second plate 2221$a$ (e.g., a rear case), the first side wall 2223$a$, the second side wall 2223$b$, and the third side wall 2223$c$ to form an inner space of the second structure 2202. In various embodiments, the third plate 2221$c$ may be referred to as a front case, and the first plate 2211$a$ of the first structure 2201 may slide while substantially facing the third plate 2221$c$. In other embodiments, the first side wall 2223$a$ may be configured as a combination of a first side wall portion 2223$a$-1 extending from the second plate 2221$a$ and a second side wall portion 2223$a$-2 formed on one edge of the third plate 2221$c$. In another embodiment, the first side wall portion 2223$a$-1 may be coupled to surround one edge of the third plate 2221$c$, for example, the second side wall portion 2223$a$-2, and in this case, the first side wall portion 2223$a$-1 itself may form the first side wall 2223$a$.

According to various embodiments, the support member 2221$d$ may be disposed in the space between the second plate 2221$a$ and the third plate 2221$c$ and have a planar shape formed of a metal or polymer material. The support member 2221$d$ may provide an electromagnetic shielding structure in the inner space of the second structure 2202 or improve the mechanical rigidity of the second structure 2202. In an embodiment, the multi-joint hinge structure 2213 and a partial area (e.g., the second region A2) of the display 2203, when received inside the second structure 2202, may be positioned in the space between the second plate 2221$a$ and the support member 2221$d$. According to other embodiments, the printed circuit board (not shown) may be disposed in the space between the third plate 2221$c$ and the support member 2221$d$. The printed circuit board may be accommodated in a space inside the second structure 2202, which is separated by the support member 2221$d$ from the space in which the multi-joint hinge structure 2213 and/or a partial area of the display 2203 is received. At least one of a processor, a memory, and an interface may be disposed on the printed circuit board. The interface may include, for example, at least one of a high-definition multimedia interface (HDMI), a universal serial bus (USB) interface, an SD card interface, and an audio interface.

According to still other embodiments, the display 2203 may include a flexible display based on an organic light-emitting diode and may be at least partially deformed into a curved shape while maintaining a generally planar shape. In an embodiment, the first region A1 of the display 2203 may be mounted or attached to the first surface F1 of the first structure 2201 to have a substantially flat shape. The second region A2 of the display 2203 may extend from the first region A1 to be supported or attached to the multi-joint hinge structure 2213. For example, the second region A2 of the display 2203 may extend along the sliding movement direction of the first structure 2201 and may be received inside the second structure 2202 together with the multi-joint hinge structure 2213 so as to be at least partially deformed to a curved shape according to the deformation of the multi-joint hinge structure 2213.

According to various embodiments, as the first structure 2201 slides on the second structure 2202, the area of the display 2203 exposed to the outside may vary. The electronic device 2200 (or the processor) may change the region of the display 2203 to be activated based on the area of the display 2203 exposed to the outside. For example, in an open state or in an intermediate state between a closed state and an open state, the electronic device 2200 may activate a region of the second structure 2202 exposed to the outside among the total area of the display 2203. As another example, in the closed state, the electronic device 2200 may activate the first region A1 of the display 2203 and deactivate the second region A2. According to other embodiments, in the closed state, if there is no user input for a specified time (e.g., 30 seconds or 2 minutes), the electronic device 2200 may deactivate the entire region of the display 2203. According to still other embodiments, in the state in which the entire region of the display 2203 is inactive, the electronic device 2200 may provide visual information through a partial area (e.g., the auxiliary display area corresponding to a portion of the second plate 2221*a* and/or rear plate 2221*b* made of a material that transmits light) of the display 2203 depending on a situation (e.g., a notification according to configuration by a user, a missed call notification, or a message arrival notification).

According to various embodiments, in the open state of the electronic device 2200, substantially the entire area (e.g., the first region A1 and the second region A2) of the display 2203 may be exposed to the outside, and the region first A1 and the second region A2 may be disposed to form a plane. In an embodiment, even if the electronic device 2200 is in the open state, a portion (e.g., one end) of the second region A2 may be positioned to correspond to the roller 2251, and the portion of the second region A2 corresponding to the roller 2251 may remain in a curved shape.

According to other embodiments, the roller 2251 (e.g., a guide member) may be rotatably mounted to the second structure 2202 at a position adjacent to one edge of the second structure 2202 (e.g., the second plate 2221*a*). The roller 2251 may be disposed adjacent to the edge IE of the second plate 2221*a* parallel to the first side wall 2223*a*. According to various embodiments, another side wall may extend from the edge IE of the second plate 2221*a* adjacent to the roller 2251, and the another side wall adjacent to the roller 2251 may be substantially parallel to the side wall 2223*a*. In various embodiments, the side wall of the second structure 2202 adjacent to the roller 2251 may be formed of a material that transmits light, and a portion of the second region A2 may provide visual information by passing through the portion of the second structure 2202 while being received in the second structure 2202.

According to still other embodiments, one end of the roller 2251 may be rotatably coupled to the second side wall 2223*b* and the opposite end thereof may be rotatably coupled to the third side wall 2223*c*. For example, the roller 2251 may be mounted to the second structure 2202 so as to rotate about the rotation axis R perpendicular to the sliding movement direction of the first structure 2201 (e.g., the direction ① in FIG. 18A or 18B). For example, the rotation axis R may be formed on one edge of the second plate 2221*a* so as to be substantially parallel to the first side wall 2223*a* but spaced apart from the first side wall 2223*a*. In an embodiment, the gap between the outer circumferential surface of the roller 2251 and the inner surface of the edge of the second plate 2221*a* may form an entrance through which the multi-joint hinge structure 2213 or the display 2203 enter the second structure 2202.

According to various embodiments, when the display 2203 is deformed into a curved shape, the roller 2251 may maintain the radius of curvature of the display 2203 to a certain degree, thereby suppressing excessive deformation of the display 2203. The excessive deformation may indicate that the display 2203 is deformed to have a small radius of curvature enough to damage pixels or signal wires included in the display 2203. The display 2203 may be moved or deformed while being guided by the roller 2251 and may be protected from damage due to the excessive deformation. In various embodiments, the roller 2251 may rotate while the multi-joint hinge structure 2213 or the display 2203 is inserted into the second structure 2202 or drawn out thereof. For example, the roller 2251 may suppress friction between the multi-joint hinge structure 2213 (or the display 2203) and the second structure 2202, thereby facilitating the multi-joint hinge structure 2213 (or the display 2203) to be inserted into the second structure 2202 or drawn out thereof.

According to other embodiments, the support sheet 2253 may be formed to include a material having flexibility and a certain degree of elasticity, for example, at least one of silicone and rubber, and may be mounted or attached to the roller 2251 so as to be selectively wound around the roller 2251 according to the rotation of the roller 2251. In the illustrated embodiment, a plurality of (e.g., four) support sheets 2253 may be arranged along the direction of the rotation axis R of the roller 2251. The plurality of support sheets may be mounted to the roller 2251 at predetermined intervals between each other and may extend in a direction perpendicular to the rotation axis R of the roller 2251. In another embodiment, one support sheet may be mounted or attached to the roller 2251. For example, the one support sheet may have a size and a shape capable of covering the disposition region of the illustrated plurality of (e.g., four) support sheets and areas between the plurality of support sheets. In various embodiments, the quantity, sizes, or shapes of the support sheets 2253 may be varied as appropriate. In other embodiments, the support sheet 2253 may be rolled around the outer circumferential surface of the roller 2251 or unrolled from the roller 2251 to a flat shape between the display 2203 and the third plate 2221*c* according to the rotation of the roller 2251. In various embodiments, the support sheet 2253 may be referred to as a support belt, an auxiliary belt, a support film, or an auxiliary film.

According to still other embodiments, an end of the support sheet 2253 may be connected to the first structure 2201, for example, the first plate 2211*a* (e.g., a slide plate) of the first structure 2201, and may be wound around the roller 2251 in the closed state of the electronic device 2200 (e.g., the state of the electronic device 2200 in FIG. 18A). Based on this, as the first plate 2211*a* moves according to the open state of the electronic device 2200 (e.g., the state of the electronic device 2200 in FIG. 18B), the support sheet 2253 may be gradually positioned between the second structure 2202 (e.g., the third plate 2221*c*) and the display 2203 (e.g., the second region A2) or between the second structure 2202 (e.g., the third plate 2221*c*) and the multi-joint hinge structure 2213. At least a portion of the support sheet 2253 may be positioned to face the multi-joint hinge structure 2213 and selectively wound around the roller 2251 according to the sliding movement of the first plate 2211*a*. In various embodiments, the support sheet 2253 may be generally disposed in contact with the multi-joint hinge structure 2213, but the portion thereof wound around the roller 2251 may be substantially separated from the multi-joint hinge structure 2213.

According to various embodiments, the distance between the surface of the display 2203 and the inner surface of the edge of the second plate 2221*a* may vary depending on the degree to which the support sheet 2253 is wound around the roller 2251. As the distance between the surface of the display 2203 and the inner surface of the edge of the second plate 2221*a* is reduced, foreign substances may be prevented from entering therethrough, but if the distance is too small, the display 2203 and the second plate 2221*a* may come into contact with or rub against each other. If the display 2203 and the second plate 2221*a* come into contact with or rub against each other, the surface of the display 2203 may be damaged or the sliding operation of the first structure 2201 may be hindered.

According to other embodiments, as the support sheet 2253 is wound around the roller 2251 in the closed state of the electronic device 2200 (e.g., the state of the electronic device 2200 in FIG. 18A), the distance between the surface of the display 2203 and the inner surface of the edge of the second plate 2221*a* may be reduced while the surface of the display 2203 is not in contact with the second plate 2221*a*. For example, as the distance between the surface of the display 2203 and the inner surface of the edge of the second plate 2221*a* is reduced, foreign substances may be prevented from flowing into the second structure 2202. In an embodiment, if the electronic device 2200 switches to the open state, the support sheet 2253 may gradually move from the roller 2251 to the space between the second structure 2202 (e.g., the second plate 2221*a* or the third plate 2221*c*) and the multi-joint hinge structure 2213 according to the movement of the first structure 2201 (e.g., the first plate 2211*a*). For example, as the first structure 2201 moves, the distance between the surface of the display 2203 and the inner surface of the edge of the second plate 2221*a* may gradually increase, thereby suppressing friction or contact between the display 2203 and other structures (e.g., the second plate 2221*a*) and preventing the surface of the display 2203 from being damaged according thereto. In still other embodiments, the support sheet 2253 may gradually increase in thickness thereof from one end (e.g., the portion fixed to the roller 2251) to the other end (e.g., the portion fixed to the first plate 2211*a*). Using the thickness profile of the support sheet 2253, the distance between the surface of the display 2203 and the inner surface of the edge of the second plate 2221*a* may be adjusted in the closed state and the open state of the electronic device 2200.

According to various embodiments, the electronic device 2200 may include one or more elastic members 131 and 133 (e.g., a low-density elastic body (sponge) or brush). The electronic device 2200 may include a first elastic member 131 mounted to one end of the display 2203, and further include a second elastic member 2233 mounted to the inner surface of the edge of the second plate 2221*a* according to an embodiment. The first elastic member 2231 may be substantially disposed in the inner space of the second structure 2202 and positioned to correspond to the edge of the second plate 2221*a* in the open state of the electronic device 2200. In an embodiment, the first elastic member 2231 may move in the inner space of the second structure 2202 according to the sliding movement of the first structure 2201. In an embodiment, if the first structure 2201 moves according to switching of the electronic device 2200 from the closed state to the open state, the first elastic member 2231 may move toward the edge of the second plate 2221*a*. In a situation in which the electronic device 2200 switches to the open state, the first elastic member 2231 may come into contact with the inner surface of the edge of the second plate 2221*a*. For example, in the open state of the electronic device 2200, the first elastic member 2231 may seal the gap between the inner surface of the edge of the second plate 2221*a* and the surface of the display 2203. In another embodiment, if the first structure 2201 moves according to switching of the electronic device 2200 from the closed state to the open state, the first elastic member 2231 may move while being in contact with the second plate 2221*a*. In this case, if a foreign substance is introduced into the gap between the second region A2 and the second plate 2221*a* of the display 2203 in the closed state of the electronic device 2200, the first elastic member 2231 may discharge the foreign substance to the outside of the second structure 2202 when the electronic device 2200 switches to the open state.

According to other embodiments, the second elastic member 2233 may be attached to the inner surface of the edge of the second plate 2221*a* and disposed to substantially face the inner surface of the display 2203. In the closed state of the electronic device 2200, the distance between the surface of the display 2203 and the inner surface of the edge of the second plate 2221*a* may be substantially determined by the second elastic member 2233. In an embodiment, in the closed state of the electronic device 2200, the second elastic member 2233 may come into contact with the surface of the display 2203, thereby substantially sealing the gap between the surface of the display 2203 and the inner surface of the edge of the second plate 2221*a*. Since the second elastic member 2233 may be formed of a low-density elastic body (e.g., a sponge) or brush, it may not damage the surface of the display 2203 even in direct contact with the display 2203. In another embodiment, as the first structure 2201 moves when the electronic device 2200 switches to the open state, the distance between the surface of the display 2203 and the inner surface of the edge of the second plate 2221*a* may be increased. For example, the second region A2 of the display 2203 may be gradually exposed to the outside of the second structure 2202 while the display 2203 does not substantially come into contact with or rub against the second elastic member 2233. In an embodiment, when the electronic device 2200 is in the open state, the first elastic member 2231 may come into contact with the second elastic member 2233. For example, the first elastic member 2231 and the second elastic member 2233 that are in contact with each other in the open state of the electronic device 2200 may seal the gap between the surface of the display 2203 and the inner surface of the edge of the second plate 2221*a*, thereby blocking inflow of foreign substances.

According to still other embodiments, the electronic device 2200 may further include at least one of a guide rail 2255 and an actuating member 2257. The guide rail 2255 may be mounted to the second structure 2202, for example, the third plate 2221*c*, to guide the sliding movement of the first structure 2201 (e.g., the first plate 2211*a*). The actuating member 2257 may include a spring or a spring module that provides an elastic force in a direction in which both ends of the actuating member 2257 go far away from each other. In an embodiment, one end of the actuating member 2257 may be rotatably supported by the second structure 2202, and the opposite end thereof may be rotatably supported by the first structure 2201. According to various embodiments, when the first structure 2201 slides, both ends of the actuating member 2257 may be located closest to each other (hereinafter, referred to as a closest point) at one section between the closed state and the open state of the electronic device 2200. In a section between the closest point and the closed state of the electronic device 2200, the actuating member 2257 may provide an elastic force to the first structure 2201 in a direction of moving toward the closed state, and in a section between the closest point and the open state of the electronic device 2200, the actuating member 2257 may provide an elastic force to the first structure 2201 in a direction of moving toward the open state.

Figure 19A:
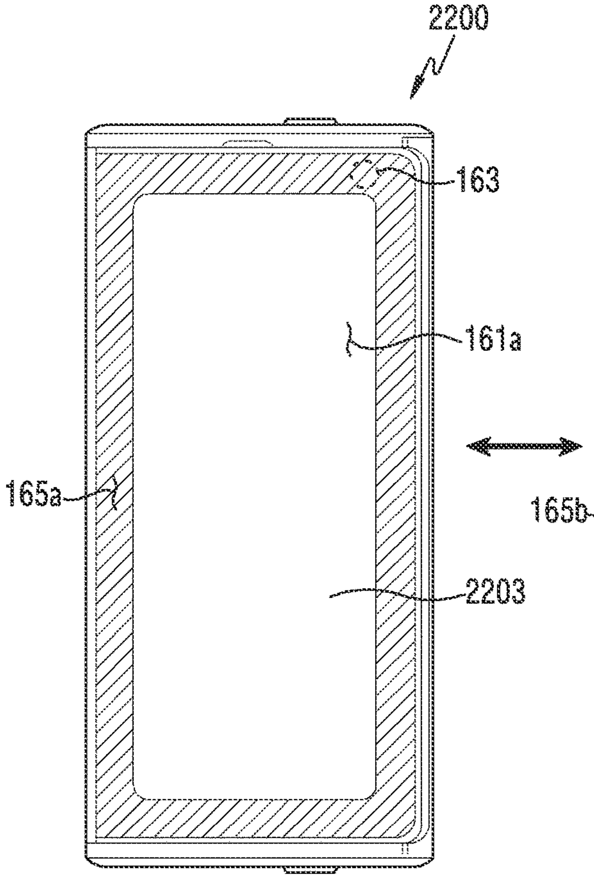
FIGS. 19A and 19B are diagrams illustrating various regions of a display device when the electronic device switches from a closed state to an open state according to various embodiments of the disclosure.
Figure 19B:
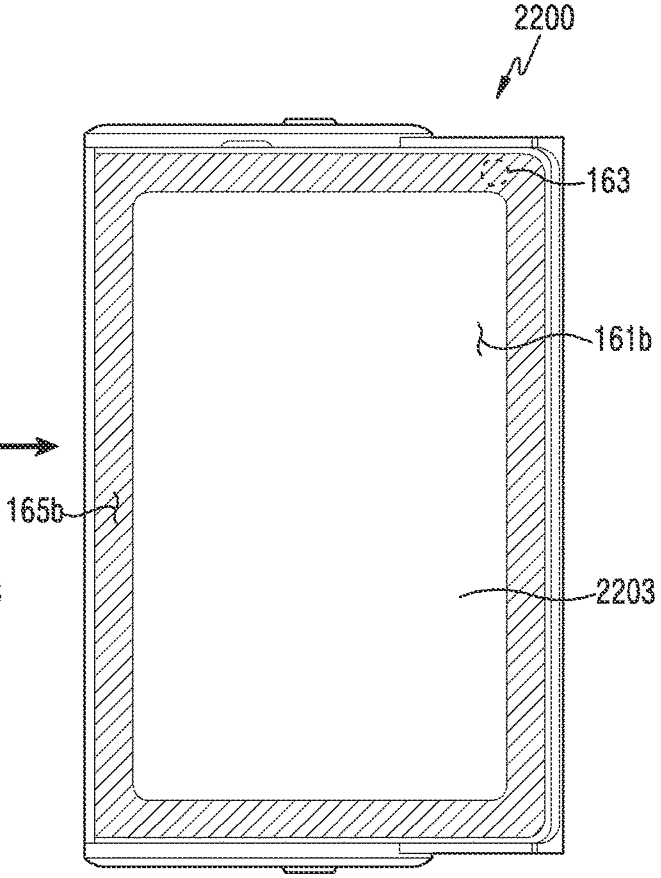

FIGS. 19A and 19B are diagrams illustrating various regions of a display device when the electronic device switches from a closed state to an open state according to various embodiments of the disclosure.

Various operations of the electronic device described with reference to FIGS. 19A and 19B may be sequentially performed subsequent to operation 405 described above with reference to FIG. 4. If it is determined that a first brightness level identified for a first region of the display device exceeds a specified threshold (e.g., the maximum brightness level capable of being covered by at least one second region) and if a second brightness level to be configured for at least one second region (e.g., the maximum brightness level capable of being covered by at least one second region or a brightness level lowered by a specified level from the maximum brightness level) is determined, the electronic device may identify a third region according to the following embodiment.

Referring to FIGS. 19A and 19B, a processor (e.g., 120 in FIG. 1) of an electronic device 2200 according to various embodiments may identify a state of the electronic device 2200 in an operation of determining a third region 165*a* or 165*b* defined to include a portion of a first region 161*a* or 161*b* and at least one second region 163 of the display 2203. For example, when determining the third region of the display 2203, the processor 120 may determine whether the electronic device 2200 is operated while a first structure (e.g., 2201 in FIG. 18A) is in a closed state (a) with respect to a second structure (e.g., 2202 in FIG. 18A) or while the first structure 2201 is in an open state (b) with respect to second structure 2202.

In an embodiment, if the electronic device 2200 is determined to be in the closed state (a), the processor 120, based on the position of at least one second region 163 formed adjacent to at least one of an upper edge or a lower edge of the display 2203, may determine a third region 165*a* defined to have a width including the at least one second region 163 in at least one of an upper edge region, a left edge region, a right edge region, and a lower edge region of the first region 161*a* (e.g., the region A1 in FIG. 18B). Similarly, if the electronic device 2200 is determined to be in the open state (b), the processor 120 may determine a third region 165*b* having a width capable of covering at least one second region 163 in at least one of an upper edge region, a left edge region, a right edge region, and a lower edge region of the extended first region 161*b* (e.g., a combination of the region A1 and the region A2 in FIG. 18B). According to the various embodiments described above, the width of the third region 165*a* or 165*b* may be determined to be the same or different from each other in at least one of the upper edge region, the left edge region, the right edge region, and the lower edge region of the first region 161*a* or 161*b*, which is determined as the third region 165*a* or 165*b*.

In another embodiment, after the determination of the third region 165*a* or 165*b* or after the brightness of at least one second region 163 and the third region 165*a* or 165*b* is configure as the second brightness level according to the determination of the third region 165*a* or 165*b*, the processor 120 may monitor an event for switching the state of the electronic device 2200. The processor 120 may identify an event for switching from the closed state to the open state of the electronic device 2200 or an event for switching from the open state to the closed state thereof.

In yet another embodiment, according to the occurrence of an event for switching the state of the electronic device 2200, the processor 120 may change or adjust the third region 165*a* or 165*b* determined (or configured as the second brightness level). According to an embodiment, if the electronic device 2200 switches from the closed state (a) to the open state (b), a portion (e.g., the region A2 in FIG. 18B) of the display 2203 may be exposed to the outside of the second structure 2202 while being guided by the roller (e.g., 2251 in FIG. 18C) mounted to the second structure 2202, and accordingly, the first region 161*b* in the open state (b) may have an expanded area, compared to the first region 161*a* in the closed state (a). In response to the first region 161*b* extended in the open state (b), the processor 120 may change or adjust the third region 165*a* defined in at least one of the upper edge region, the left edge region (or the right edge region), and the lower edge region of the first region 161*a* in the closed state (a). The processor 120 may change or adjust the third region 165*a* defined in at least one of the upper edge region and the lower edge region of the first region 161*a* in the closed state (a) into to the third region 165*b* extending in the direction (e.g., the direction ① in FIG. 18A or 18B) in which the electronic device 2200 switches the state, and change or adjust the third region 165*a* defined in the left edge region (or the right edge region) of the first region 161*a* in the closed state (a) into to the third region 165*b* to be moved to the left edge region (or the right edge region) of the extended first region 161*b* in the open state (b).

According to yet another embodiment, if the electronic device 2200 switches from the open state (b) to the closed state (a), a portion (e.g., the region A2 in FIG. 18B) of the display 2203 may be received inside the second structure 2202 while being guided by the roller (e.g., 2251 in FIG. 18C) mounted to the second structure 2202, and accordingly, the first region 161*a* in the closed state (a) may have a reduced area compared to the first region 161*b* in open state (b). In response to the first region 161*a* reduced in the closed state (a), the processor 120 may change or adjust the third region 165*b* defined in at least one of the upper edge region, the left edge region (or the right edge region), and the lower edge region of the first region 161*b* in the open state (b). For example, the processor 120 may change or adjust the third region 165*b* defined in at least one of the upper edge region and the lower edge region of the first region 161*b* in the open state (b) into to the third region 165*a* reduced in the direction (e.g., the direction ① in FIG. 18A or 18B) in which the electronic device 2200 switches the state, and change or adjust the third region 165*b* defined in the left edge region (or the right edge region) of the first region 161*b* in the open state (b) into to the third region 165*a* to be moved to the left edge region (or the right edge region) of the reduced first region 161*a* in the closed state (a).

In an embodiment, the electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a display;

an optical sensor disposed under the display;

memory storing one or more computer programs; and one or more processors communicatively coupled to the display, the optical sensor, and the memory, wherein the display comprises:

a first region having a first pixel density, and a second region having a second pixel density, which is less than the first pixel density, and corresponding to a disposition region of the optical sensor, and wherein the one or more computer programs include computer-executable instructions that, when executed by the one or more processors individually or collectively, cause the electronic device to:

identify a first brightness level for the first region, in case that the first brightness level exceeds a specified threshold, determine a second brightness level for the second region, based on at least one of the first brightness level, the first pixel density, and the second pixel density, identify a third region of the display defined to include the second region, the second region being disposed along an edge of the first region, the third region being defined along all edges of the first region to surround the first region, and configure the brightness of the second region and the third region as the second brightness level.

2. The electronic device of claim 1, wherein the one or more computer programs further include computer-executable instructions that, when executed by the one or more processors individually or collectively, cause the electronic device to:

obtain a dominant color from a screen displayed on the first region, excluding the third region, and apply a gradation effect to the third region, based on the obtained color.

3. The electronic device of claim 1, wherein the one or more computer programs further include computer-executable instructions that, when executed by the one or more processors individually or collectively, cause the electronic device to configure a maximum brightness level at which the second region is maximally bright as the specified threshold.

4. The electronic device of claim 3, wherein the one or more computer programs further include computer-executable instructions that, when executed by the one or more processors individually or collectively, cause the electronic device to:

determine the maximum brightness level as the second brightness level in case that the first brightness level exceeds the specified threshold by a specified level range or more, and determine a brightness level lower than the maximum brightness level as the second brightness level in case that the first brightness level exceeds the specified threshold by less than the specified level range.

5. The electronic device of claim 3, wherein one or more computer programs further include computer-executable instructions that, when executed by the one or more processors individually or collectively, cause the electronic device to:

identify an on-pixel ratio (OPR) of the display, in case that the OPR of the display exceeds a specified OPR threshold, determine the maximum brightness level as the second brightness level, and in case that the OPR of the display does not exceed the specified OPR threshold, determine a brightness level lower than the maximum brightness level as the second brightness level.

6. The electronic device of claim 1, wherein one or more computer programs further include computer-executable instructions that, when executed by the one or more processors individually or collectively, cause the electronic device to:

identify the third region having a first width in case that the first brightness level exceeds the specified threshold by less than a specified level range, and identify the third region having a second width greater than the first width in case that the first brightness level exceeds the specified threshold by the specified level range or more.

7. The electronic device of claim 1, wherein one or more computer programs further include computer-executable instructions that, when executed by the one or more processors individually or collectively, cause the electronic device to:

supply a first driving power to the second region, and supply a second driving power less than the first driving power to the third region, as at least part of configuring the second region and the third region as the second brightness level.

8. The electronic device of claim 1, wherein the one or more computer programs further include computer-executable instructions that, when executed by the one or more processors individually or collectively, cause the electronic device to:

in case that the first brightness level does not exceed the specified threshold, determine a third brightness level for the second region, based on at least one of the first brightness level, the first pixel density, and the second pixel density, and configure the brightness of the second region as the third brightness level corresponding to the first brightness level.

9. The electronic device of claim 1, wherein the one or more computer programs further include computer-executable instructions that, when executed by the one or more processors individually or collectively, cause the electronic device to identify the first brightness level for the first region while displaying a screen using the display.

10. The electronic device of claim 1, wherein the first region includes a plurality of first pixel regions based on the first pixel density, and the second region includes a plurality of second pixel regions and a plurality of non-pixel regions based on the second pixel density.

11. The electronic device of claim 1, wherein the brightness of the second region and the third region is configured as the second brightness level based on a degree of folding of the electronic device.

12. A display control method of an electronic device comprising a display that comprises a first region having a first pixel density and a second region having a second pixel density less than the first pixel density, the method comprising:

identifying a first brightness level for the first region;

identifying that the first brightness level exceeds a specified threshold;

determining a second brightness level for the second region, based on at least one of the first brightness level, the first pixel density, and the second pixel density;

identifying a third region of the display defined to include the second region, the second region being disposed along an edge of the first region, the third region being defined along all edges of the first region to surround the first region; and configuring the brightness of the second region and the third region as the second brightness level, wherein the electronic device comprises an optical sensor disposed under the second region.

13. The display control method of claim 12, further comprising:

obtaining a dominant color from a screen displayed on the first region, excluding the third region; and applying a gradation effect to the third region, based on the obtained color.

14. The display control method of claim 12, wherein the identifying that the first brightness level exceeds a specified threshold comprises configuring a maximum brightness level at which the second region is maximally bright as the specified threshold.

15. The display control method of claim 14, wherein the determining of the second brightness level for the second region comprises:

in case that the first brightness level exceeds the specified threshold by a specified level range or more, determining the maximum brightness level as the second brightness level; and in case that the first brightness level exceeds the specified threshold by less than the specified level range, determining a brightness level lower than the maximum brightness level as the second brightness level.

16. The display control method of claim 14, further comprising:

identifying an on-pixel ratio (OPR) of the display, wherein the determining of the second brightness level for the second region comprises:

in case that the OPR of the display exceeds a specified OPR threshold, determining the maximum brightness level as the second brightness level, and in case that the OPR of the display does not exceed the specified OPR threshold, determining a brightness level lower than the maximum brightness level as the second brightness level.

17. The display control method of claim 12, wherein the identifying of the third region of the display comprises:

identifying the third region having a first width in case that the first brightness level exceeds the specified threshold by less than a specified level range; and identifying the third region having a second width greater than the first width in case that the first brightness level exceeds the specified threshold by the specified level range or more.

18. The display control method of claim 12, wherein the configuring of the brightness of the second region and the third region as the second brightness level comprises:

supplying a first driving power to the second region; and supplying a second driving power less than the first driving power to the third region.

19. An electronic device comprising:

a display;

an optical sensor disposed under the display; and a display driver integrated circuit electrically connected to the display, wherein the display comprises:

a first region having a first pixel density, and a second region having a second pixel density, which is less than the first pixel density, and corresponding to a disposition region of the optical sensor, and wherein the display driver integrated circuit is configured to:

identify a first brightness level for the first region, in case that the first brightness level exceeds a specified threshold, determine a second brightness level for the second region, based on at least one of the first brightness level, the first pixel density, and the second pixel density, identify a third region of the display defined to include the second region, the second region being disposed along an edge of the first region, the third region being defined along all edges of the first region to surround the first region, and configure the brightness of the second region and the third region as the second brightness level.

20. The electronic device of claim 19, wherein the display driver integrated circuit is further configured to:

obtain a dominant color from a screen displayed on the first region, excluding the third region, and apply a gradation effect to the third region, based on the obtained color.

* * * * *